(12) United States Patent
Dinger

(10) Patent No.: US 11,337,405 B1
(45) Date of Patent: May 24, 2022

(54) WATER FOUNTAIN FOR PETS INCLUDING DRINKING RESERVOIR REMOVABLY MOUNTABLE TO HOUSING UNIT SEAT

(71) Applicant: David M. Dinger, Osprey, FL (US)

(72) Inventor: David M. Dinger, Osprey, FL (US)

( * ) Notice: Subject to any disclaimer, the term of this patent is extended or adjusted under 35 U.S.C. 154(b) by 143 days.

(21) Appl. No.: 16/865,868

(22) Filed: May 4, 2020

Related U.S. Application Data

(63) Continuation-in-part of application No. 15/676,885, filed on Aug. 14, 2017, now abandoned.

(60) Provisional application No. 62/377,208, filed on Aug. 19, 2016.

(51) Int. Cl.
*A01K 7/02* (2006.01)
*A01K 7/00* (2006.01)

(52) U.S. Cl.
CPC .............. *A01K 7/025* (2013.01); *A01K 7/005* (2013.01)

(58) Field of Classification Search
CPC .......... A01K 7/005; A01K 7/02; A01K 7/025; A01K 7/04
USPC .......................................................... 119/78
See application file for complete search history.

(56) References Cited

U.S. PATENT DOCUMENTS

| | | | | |
|---|---|---|---|---|
| 4,100,885 A * | 7/1978 | Kapplinger | ............ | A01K 7/025 119/73 |
| 4,509,460 A * | 4/1985 | Seltzer | ..................... | A01K 7/02 119/74 |
| 4,646,687 A * | 3/1987 | Peterson | ................... | A01K 7/02 119/73 |
| 4,856,459 A * | 8/1989 | Wiseman | ............... | A01K 7/027 119/73 |
| 4,922,858 A * | 5/1990 | Ahrens | ..................... | A01K 7/04 119/73 |
| 5,799,609 A * | 9/1998 | Burns | ...................... | A01K 7/00 119/74 |
| 5,842,437 A * | 12/1998 | Burns | .................... | A01K 7/005 119/74 |
| 6,526,916 B1 * | 3/2003 | Perlsweig | ............... | A01K 7/06 119/74 |
| 6,928,954 B2 * | 8/2005 | Krishnamurthy | ...... | A01K 7/025 119/51.5 |
| 7,281,494 B1 * | 10/2007 | Connerley | ............... | A01K 7/02 119/74 |
| 7,762,211 B1 * | 7/2010 | McDaniel | ............... | A01K 7/02 119/51.5 |
| 8,516,975 B2 * | 8/2013 | Becattini, Jr. | .......... | A01K 7/005 119/61.54 |
| D769,548 S * | 10/2016 | Spiegel | ........................ | D30/132 |
| 2010/0175625 A1 * | 7/2010 | Klenotiz | .................. | A01K 7/06 119/75 |
| 2012/0111280 A1 * | 5/2012 | Shin | ....................... | A01K 7/027 119/78 |

(Continued)

*Primary Examiner* — Brady W Frazier
(74) *Attorney, Agent, or Firm* — H. John Rizvi; John Rizvi—The Patent Professor®

(57) ABSTRACT

A self-watering, self-draining water fountain includes a drinking reservoir mountable in a housing unit. The water fountain incorporates a variety of overflow protection features to address water overflow. The fountain also includes various complementary attachment features enabling the drinking reservoir to releasably mount to the housing unit. An arrangement of complementary convex and concave features incorporated into the drinking reservoir and housing unit facilitates guided location and positioning of the drinking reservoir onto a seat of the housing unit.

20 Claims, 15 Drawing Sheets

(56) References Cited

U.S. PATENT DOCUMENTS

| | | | | |
|---|---|---|---|---|
| 2013/0092090 A1* | 4/2013 | McCallum | ........... | A01K 1/0356 |
| | | | | 119/74 |
| 2015/0189856 A1* | 7/2015 | Alexander | ............... | A01K 7/02 |
| | | | | 119/74 |
| 2016/0286757 A1* | 10/2016 | Armstrong | ............... | A01K 7/02 |

* cited by examiner

WATER FOUNTAIN FOR PETS INCLUDING DRINKING RESERVOIR REMOVABLY MOUNTABLE TO HOUSING UNIT SEAT

CROSS-REFERENCE TO RELATED APPLICATION

This application is a continuation-in-part of co-pending U.S. patent application Ser. No. 15/676,885, filed Aug. 14, 2017, which claims the benefit of U.S. Provisional Patent Application Ser. No. 62/377,208, filed Aug. 19, 2016, all of which are incorporated herein by reference thereto in their entirety.

FIELD OF THE INVENTION

The present invention relates generally to water fountains for pets, and more particularly, to a self-filling, self-draining water fountain device, which is connected to a pressurized water system and a drainage system, providing permanently-available drinking water in an open reservoir for animal consumption.

BACKGROUND OF THE INVENTION

Pet owners consider pets a part of the family and want to provide the best possible care available. Pets require a large amount of time for care including feeding, watering, cleaning and exercising. For instance, pet dogs may require as much as three or four hours a day of close attention.

Unfortunately, modern lifestyle makes it difficult to meet pets' needs on a daily basis. Often pets are left alone as owners are working or involved in activities that pets are not allowed to participate in. When pets are home alone there is no one to provide water. In the event of an emergency or unforeseen situation, a pet may be faced with no water for a long period of time. Furthermore, owners may forget to fill the watering bowl even when they are home. The filling of a water bowl may become a worry or nuisance and could be automated, freeing owners from this burden.

Some automatic pet water fountains have been developed to solve the above problems. These automatic water fountains normally include an electrical water pump which pumps water from a pre-filled container into a drinking reservoir. These electrical water fountains, however, are cumbersome to use and maintain. For instance, the container must be manually filled when it runs out of water. In addition, the water fountain must be cleaned on a regular basis. Furthermore, malfunctions of the water pump may cause the fountain to overflow and damage the surrounding property. Finally, low-cost electrical water pumps are generally non-durable, and the water fountain may not be reliable as a single water source for a pet; for this reason, owners must provide their pets with a backup water bowl in case the automatic water fountain fails.

Therefore, there remains a need for an automatic pet water fountain that provides readily accessible water to pets, is easy and safe to operate, and requires little or no supervision from the human user or owner.

SUMMARY OF THE INVENTION

The present invention, in one form, is directed to an animal drinking assembly including a drinking reservoir mountable in a housing unit. The drinking assembly includes a variety of overflow protection features to address water overflow, which may occur from both the drinking reservoir and a fluid supply container. The drinking assembly further includes various passive attachment features enabling the drinking reservoir to releasably mount to the housing unit. An arrangement of complementary convex and concave features incorporated into the drinking reservoir and housing unit facilitates guided location and positioning of the drinking reservoir onto a seat of the housing unit.

According to one implementation of the present invention, a drinking assembly comprising a first subassembly and a second subassembly. The first subassembly includes, in combination, a partition having a front side and a rear side, a fluid supply container disposed at the rear side of the partition, a supply aperture formed in the partition and opening into the supply container, a seat extending from the partition at the front side thereof at a location below the supply aperture, and a sidewall extending from the partition at the front side thereof and contiguously spanning a periphery of the seat. The second subassembly includes, in combination, a drinking reservoir removably mountable to the seat of the first subassembly; the drinking reservoir including a bottom, a rear wall, and a sidewall extending from the rear wall and contiguously spanning a periphery of the bottom; and an inlet aperture formed in the rear wall and alignable with the supply aperture formed in the partition.

In one aspect of the invention, the first subassembly further comprises a drain hole formed in the seat, at least one convex feature formed at an upper side of the seat, and an overflow slot formed in the partition and opening into the supply container, and a first coupling feature formed at a generally front location of the seat and having a female portion. The sidewall includes an upper sidewall portion, a lower sidewall portion, and a shoulder-forming transition portion joining the upper sidewall portion and the lower sidewall portion and defining an offset of the upper sidewall portion relative to the lower sidewall portion, and wherein the seat is generally coplanar with the transition portion. The second subassembly further comprises at least one concave feature formed at a lower side of the bottom of the drinking reservoir and mateably complementary to the at least one convex feature of the first subassembly; wherein the rear wall of the drinking reservoir includes a main wall section and an offset wall section adjoining the main wall section, wherein the inlet aperture is formed in the offset wall section; and a second coupling feature formed at an outer, generally front surface of the sidewall of the drinking reservoir and having a male portion mateably complementary to the female portion of the first coupling feature.

In another aspect, the first coupling feature of the first subassembly further includes a generally curved, raised body having a top side, a front side, a rear side, and a generally laterally extending groove formed in the rear side and defining the female portion; and the second coupling feature of the second subassembly further includes a generally laterally extending projection defining the male portion and formed at a recessed section of the sidewall of the drinking reservoir.

In another aspect, a coverage footprint of the sidewall of the drinking reservoir of the second subassembly is smaller than a coverage footprint of the upper sidewall portion of the sidewall of the first subassembly to define a clearance gap therebetween.

In another aspect, the drinking assembly further includes an assembled configuration adoptable by the drinking assembly featuring the drinking reservoir of the second subassembly removably housed in the first subassembly at the seat thereof. The adoptable configuration further includes, in combination, a first clearance gap defined between the partition of the first subassembly at the front side thereof and the rear wall of the drinking reservoir of the second subassembly at the main wall section thereof; a second clearance gap defined between the sidewall of the drinking reservoir of the second subassembly and the upper sidewall portion of the sidewall of the first subassembly; a third clearance gap defined between the bottom of the drinking reservoir of the second subassembly and an upper side of the seat of the first subassembly; and a fourth clearance gap defined by the offset of the upper sidewall portion relative to the lower sidewall portion of the sidewall of the first subassembly.

In still another aspect, the drinking assembly further includes a grommet disposed in the supply aperture, wherein during assembly the inlet aperture of the drinking reservoir receives the grommet; a pair of front feet disposed at the lower side of the bottom of the drinking reservoir; at least one attachment feature disposed at the rear side of the partition and configured to facilitate mounting of the drinking assembly; a handle-forming indentation formed at an outer front end of the sidewall of the drinking reservoir to define a recessed surface, and a generally laterally extending rib projection formed at the recessed surface and defining the male portion of the second coupling feature of the second subassembly; and a raised retaining structure extending from the seat and defining the first coupling feature of the first subassembly, the retaining structure having a top side, a front side, a rear side, and a generally laterally extending groove formed in the rear side and defining the female portion of the first coupling feature. The upper sidewall portion of the sidewall of the first subassembly includes a first variable-height section and a second variable-height section each disposed at a respective end of the sidewall adjacent the partition.

In yet another aspect, the drinking assembly further includes a pair of spaced-apart track guides disposed opposite the offset wall section of the rear wall of the drinking reservoir to define a generally vertically-oriented filter-receiving slot therebetween. Additionally, the offset wall section has a sufficient thickness such that during reception of the grommet into the inlet aperture during assembly, a filter-occupying space of the filter-receiving slot is free of intrusion from the grommet.

In yet another aspect, an opening is formed at a lower edge of the partition to facilitate rear side access to the drain hole formed in the seat.

According to another implementation of the present invention, a drinking assembly includes a housing unit and an open drinking reservoir. The housing unit includes, in combination, a wall partition having a front side and a rear side, a fluid supply container disposed at the rear side of the partition, a fluid supply aperture formed in the partition and opening into the supply container, an overflow slot formed in the partition and opening into the supply container, a generally horizontal seat extending from the partition at the front side thereof at a location below the supply aperture, a drain hole formed in the seat, a generally curved sidewall extending from the partition at the front side thereof and circumscribing the seat, a raised retaining structure formed at a front area of the seat and having a top side, a front side, a rear side, and a generally laterally extending groove formed in the rear side and defining a female portion, and at least one protuberance extending upward from the seat. The drinking reservoir is removably mountable to the housing seat. The drinking reservoir includes, in combination, a body having a bottom side, a rear side, and a generally curved sidewall extending from the rear side and circumscribing the bottom side; an inlet aperture formed in the rear side and alignable during assembly with the supply aperture formed in the partition; an indentation formed at an outer front end of the sidewall of the drinking reservoir to define a recessed surface; a generally laterally extending rib projection formed at the recessed surface and defining a male portion mateably complementary to the female portion of the retaining structure of the housing unit; and at least one depression formed at a lower outer surface of the bottom side and configured to be mateably complementary to the at least one protuberance at the seat of the housing unit.

In one aspect, the at least one protuberance extending from the seat of the housing unit includes at least one convex feature disposed generally longitudinally; and the at least one depression formed in the bottom side of the drinking reservoir includes at least one concave feature disposed generally longitudinally.

In another aspect, the curved sidewall of the housing unit includes an upper sidewall portion, a lower sidewall portion, and a shoulder-forming transition portion joining the upper sidewall portion and the lower sidewall portion and defining an offset of the upper sidewall portion relative to the lower sidewall portion. The seat of the housing unit is generally coplanar with the transition portion.

In another aspect, the drinking assembly further includes an assembled configuration adoptable by the drinking assembly featuring the drinking reservoir removably disposed in the housing unit at the seat thereof. The adoptable assembled configuration further includes, in combination, a first clearance gap defined between the partition of the housing unit at the front side thereof and the rear side of the drinking reservoir; a second clearance gap defined between the sidewall of the drinking reservoir and the upper sidewall portion of the sidewall of the housing unit; a third clearance gap defined between the bottom side of the drinking reservoir and an upper side of the seat of the housing unit; and a fourth clearance gap defined by the offset of the upper sidewall portion relative to the lower sidewall portion of the sidewall of the housing unit.

In still another aspect, the adoptable assembled configuration further includes: at a front end of the seat-disposed drinking reservoir, a mating interfit engagement between the rib projection of the drinking reservoir and the groove of the retaining structure of the housing unit; at a rear end of the seat-disposed drinking reservoir, a fluid communication pathway between the inlet aperture of the drinking reservoir and the supply aperture formed in the partition of the housing unit; and at an underside of the drinking reservoir, a corresponding mating engagement between the at least one protuberance of the housing unit and the at least one depression of the drinking reservoir to define an interface therebetween suitable to locate the drinking reservoir in the housing unit at the seat thereof.

In yet another aspect, a grommet is disposed in the supply aperture, wherein the adoptable assembled configuration further includes reception of the grommet by the inlet aperture of the drinking reservoir.

In yet another aspect, the drinking assembly further includes an assembled configuration adoptable by the drinking assembly featuring the drinking reservoir removably mounted to the housing unit at the seat thereof. The adoptable assembled configuration further includes: at a front end of the seat-mounted drinking reservoir, a mating interfit engagement between the rib projection of the drinking reservoir and the groove of the retaining structure of the housing unit; at a rear end of the seat-mounted drinking reservoir, a fluid communication pathway between the inlet aperture of the drinking reservoir and the supply aperture formed in the partition of the housing unit; and, at an underside of the drinking reservoir, a corresponding mating engagement between the at least one protuberance of the housing unit and the at least one depression of the drinking reservoir to define an interface therebetween suitable to locate the drinking reservoir in the housing unit at the seat thereof.

According to yet another implementation of the present invention, a drinking combination includes a housing unit and an open drinking reservoir removably supportable in the housing unit. The housing unit includes, in combination, a partition having a front side and a rear side, a fluid supply container disposed at the rear side of the partition, a fluid supply aperture formed in the partition and opening into the supply container, an overflow slot formed in the partition and opening into the supply container, a seat extending from the partition at the front side thereof at a location below the supply aperture, a drain hole formed in the seat, a sidewall extending from the partition at the front side thereof and peripherally surrounding the seat, a raised retaining structure formed at a front area of the seat and having a top side, a front side, a rear side, and a generally laterally extending groove formed in the rear side, and at least one protuberance feature extending from the seat. The drinking reservoir is removably supportable in the housing unit at the seat thereof. The drinking reservoir includes, in combination, a body having a bottom side, a rear side, and a sidewall extending from the rear side and surrounding the bottom side, an inlet aperture formed in the rear side, an indentation formed at an outer front end of the sidewall of the drinking reservoir to define a recessed surface, a generally laterally extending ridge projection formed at the recessed surface of the indentation and mateably complementary to the groove formed in the retaining structure of the housing unit, and at least one depression feature formed at a lower outer surface of the bottom side of the drinking reservoir body and configured to be mateably complementary to the at least one protuberance feature at the seat of the housing unit. The drinking combination further includes an assembled configuration adoptable by the drinking combination featuring the drinking reservoir removably mounted to the housing unit at the seat thereof. The adoptable assembled configuration further includes: at a front end of the seat-mounted drinking reservoir, a mating interfit engagement between the ridge projection of the drinking reservoir and the groove of the retaining structure of the housing unit; at a rear end of the seat-mounted drinking reservoir, a fluid communication pathway between the inlet aperture of the drinking reservoir and the supply aperture formed in the partition of the housing unit; and, at an underside of the drinking reservoir, a corresponding mating engagement between the at least one protuberance feature of the housing unit and the at least one depression feature of the drinking reservoir to define an interface therebetween suitable to locate the drinking reservoir in the housing unit at the seat thereof.

In one aspect, the adoptable assembled configuration further includes, in combination, a first clearance gap defined between the partition of the housing unit at the front side thereof and the rear side of the drinking reservoir; a second clearance gap defined between the sidewall of the drinking reservoir and a portion of the sidewall of the housing unit facing the sidewall of the drinking reservoir; and a third clearance gap defined between the bottom side of the drinking reservoir and an upper side of the seat of the housing unit.

In another aspect, the sidewall of the housing unit further includes an upper sidewall portion, a lower sidewall portion, and a shoulder-forming transition portion joining the upper sidewall portion and the lower sidewall portion and defining an offset of the upper sidewall portion relative to the lower sidewall portion. The seat of the housing unit is generally coplanar with the transition portion. The adoptable assembled configuration further includes a fourth clearance gap defined by the offset of the upper sidewall portion relative to the lower sidewall portion of the sidewall of the housing unit.

In yet another aspect, the rear side of the drinking reservoir body includes a main wall section and an offset wall section adjoining the main wall section, wherein the inlet aperture is formed in the offset wall section. The first clearance gap is defined between the partition of the housing unit at the front side thereof and the rear side of the drinking reservoir at the main wall section thereof.

In yet another aspect, the drinking combination further includes a pair of front feet disposed underneath the drinking reservoir body; and, at least one attachment feature disposed at the rear side of the partition and configured to facilitate mounting of the housing unit. The upper sidewall portion of the sidewall of the housing unit includes a first variable-height section and a second variable-height section each disposed at a respective end of the sidewall adjacent the partition and configured to ascend towards the partition.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
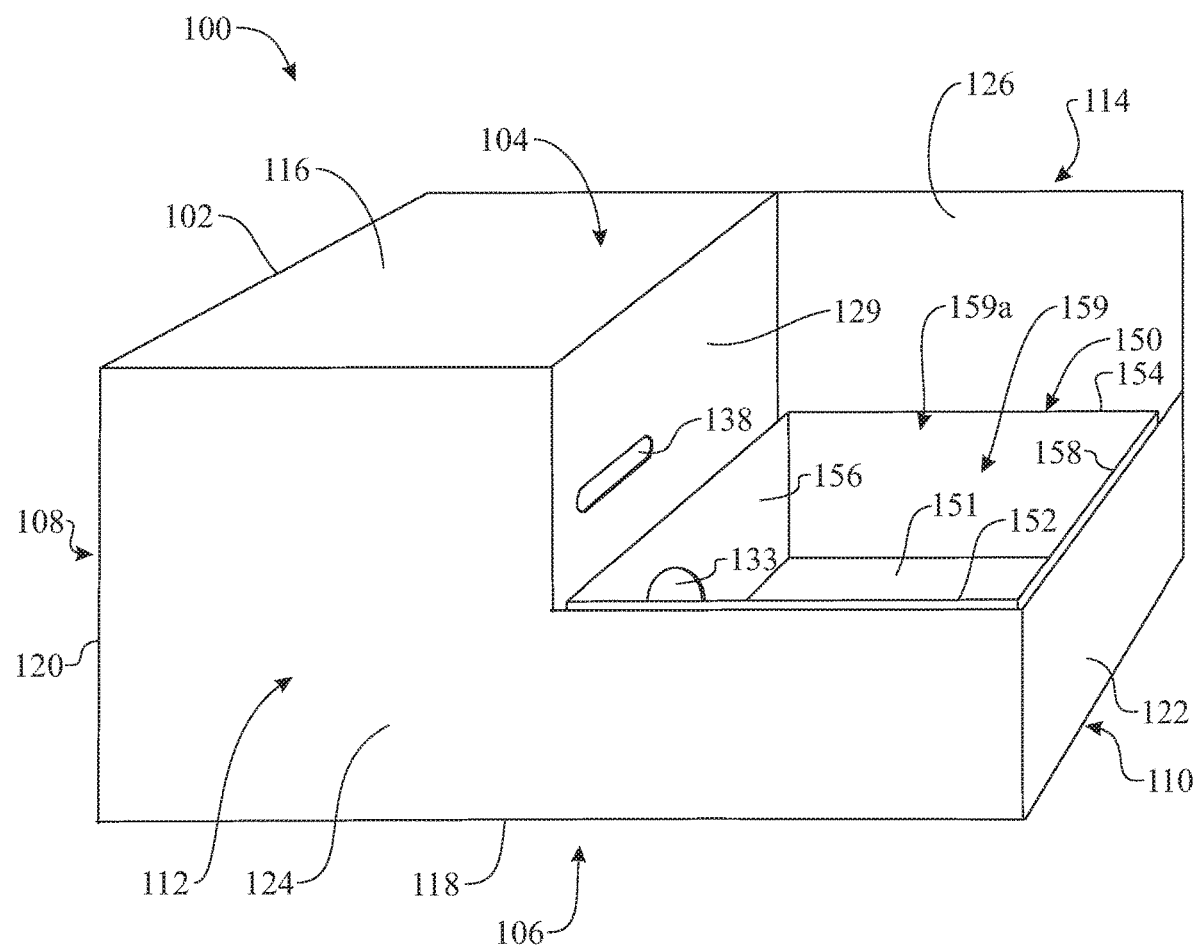
FIG. 1 presents a top front perspective view of a water fountain for pets in accordance with an illustrative embodiment of the invention.
Figure 2:
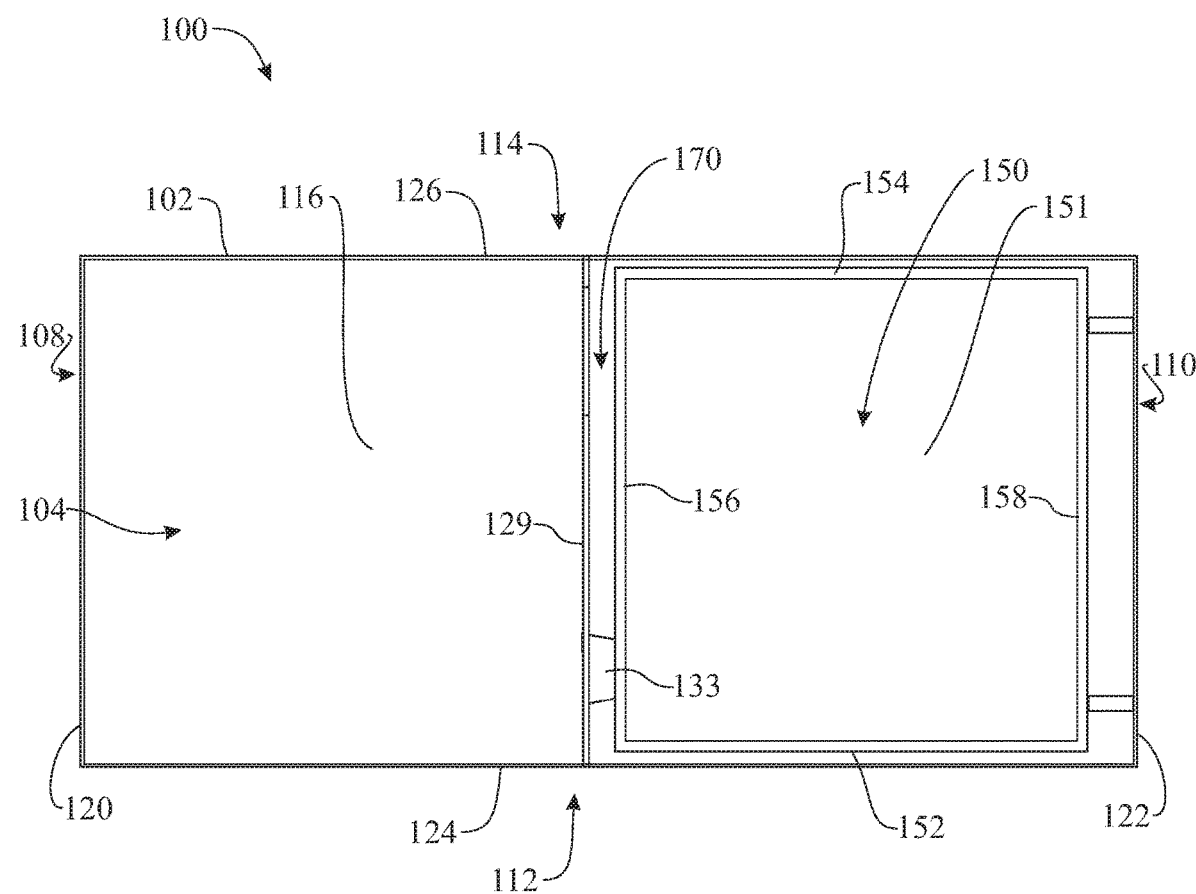
FIG. 2 presents a top plan view of the water fountain of FIG. 1, with the removable top wall shown in place.

Referring initially to FIGS. 1 and 2, a water fountain 100 is shown comprising a body 102 having a top side 104, a base or bottom side 106, a left side 108, a right side 110, a front side 112 and a rear side 114. At the top side 104, the body 102 is provided with a top wall 116. A bottom wall 118 is provided on the bottom side 106. Left and right side walls 120 and 122 are provided on the left and right sides 108 and 110 of the body 102. A bottom wall 118, in turn, is provided on the bottom side 106 of the body 102.

Figure 4:
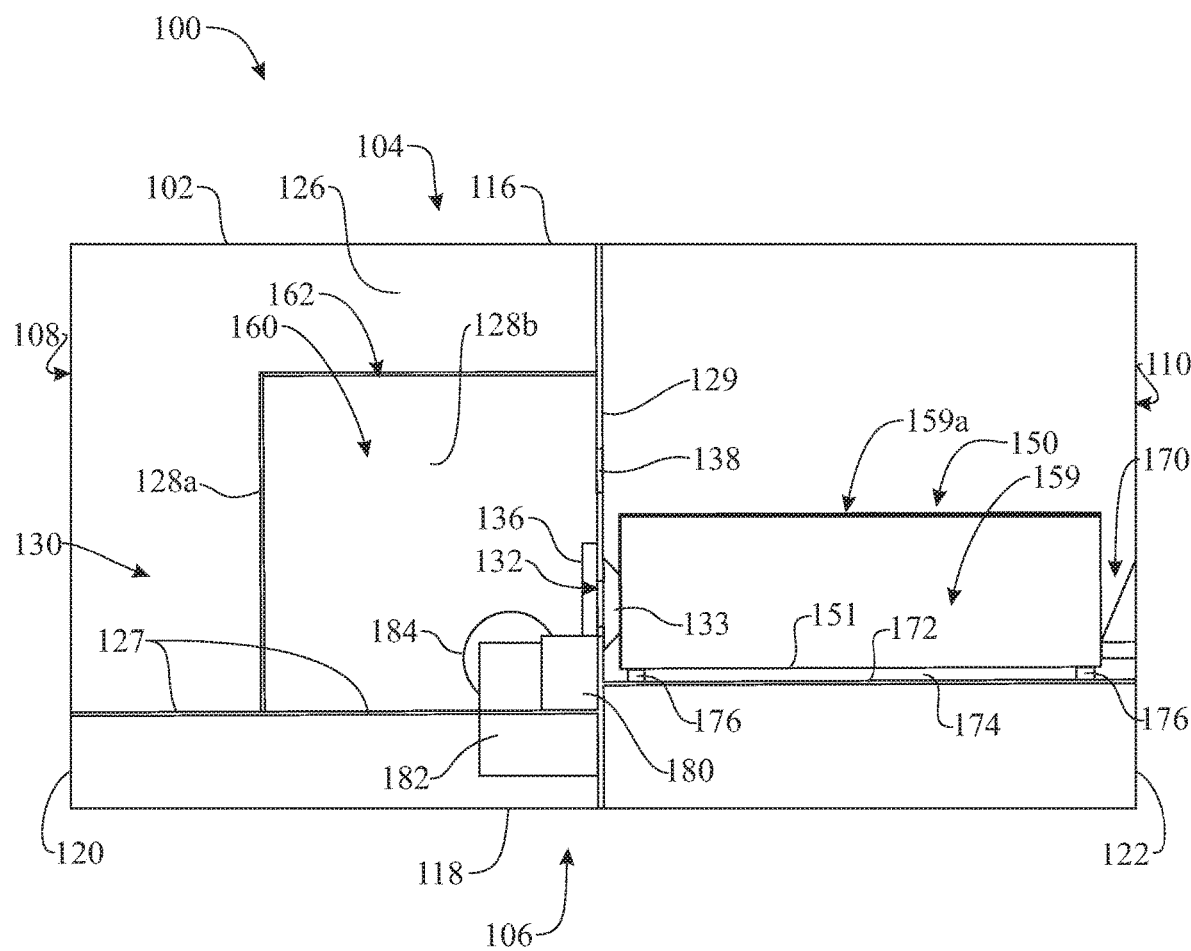
FIG. 4 presents a cross-sectional, front elevation view of the water fountain of FIG. 1, the cross-section taken along section plane 4-4 indicated in FIG. 3, the float valve assembly and water intake components having been omitted in the figure.

In some embodiments, the bottom side 106 of the body 102 is configured to sit on a floor or other generally horizontal surface; for instance, as shown in FIG. 4, the bottom wall 118 can be planar in order to flatly rest on a horizontal surface. Alternatively or additionally, the left side 108 and/or rear side 114 can be configured to be permanently fastened to a vertical surface such as but not limited to a wall, cabinet or other permanent surface; for instance, the front wall 124 and rear wall 126 of the present embodiment are planar and configured to rest flatly on a flat, vertical surface. In some embodiments, the water fountain 100 can be installed as a permanent fixture in a home or other facility, permanently connected to a water supply as will be explained in greater detail hereinafter so that the water fountain 100 can operate unassisted. The human user will only be required to change a filter on a periodic basis in order for the water fountain 100 to provide clean filtered water.

Figure 3:
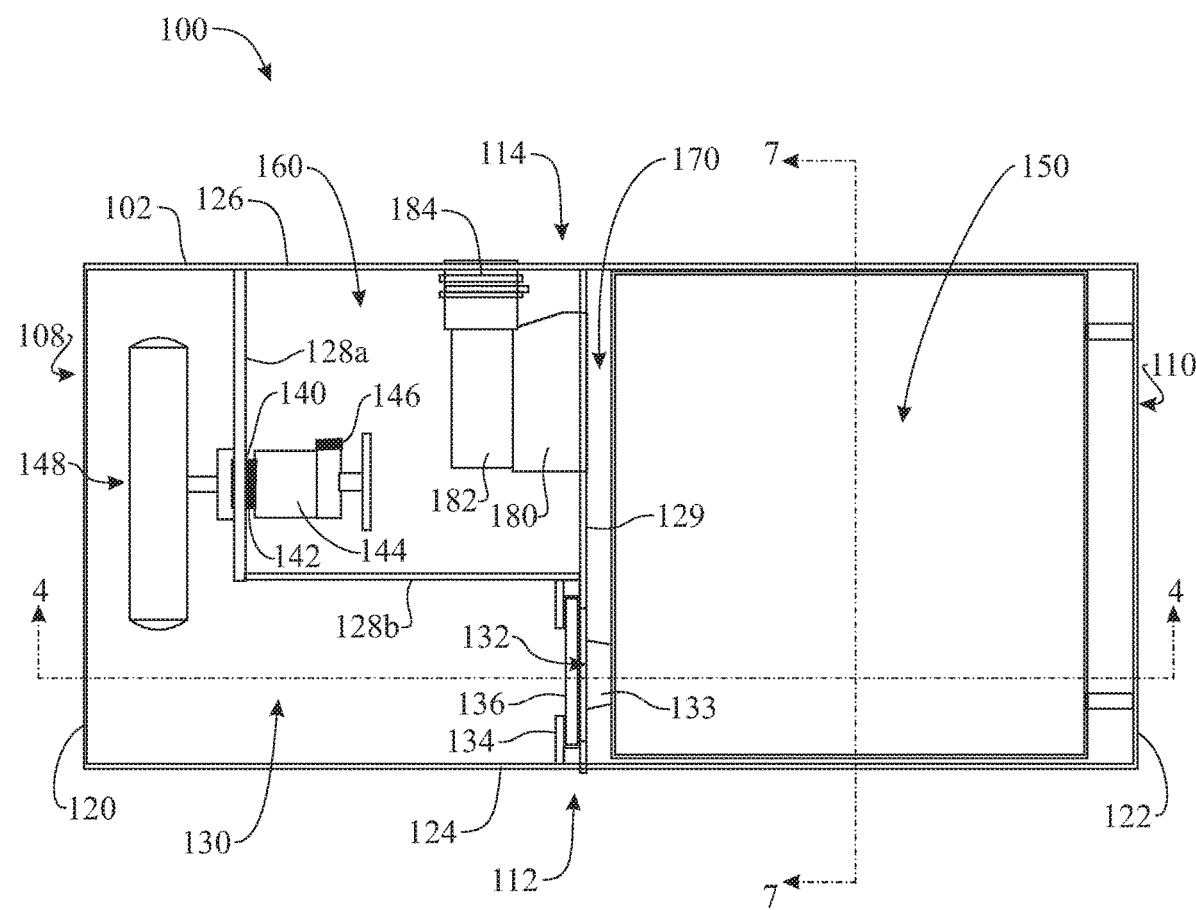
FIG. 3 presents a top plan view of the water fountain of FIG. 1, having opened and removed the removable top wall to reveal the first reservoir and auxiliary space.

On the left side 108 of the body 102, a first reservoir 130 for receiving water is formed. As best shown in FIGS. 3 and 4, the first reservoir 130 of the present embodiment is delimited by the top wall 116, the left side wall 120, the front wall 124, the rear wall 126, a floor partition 127, two vertical partitions 128*a* 128*b* and a front-to-back, vertical wall or divider 129 which extends from the front wall 124 to the rear wall 126. In the present embodiment, the vertical partitions 128*a* and 128*b* are arranged forming a 90-degree angle and separate an auxiliary space 160 from the first reservoir 130. The auxiliary space 160 is further delimited by the rear wall 126, the floor partition 127 and the divider 129. The auxiliary space 160 is accessible via a top opening 162, best shown in FIGS. 3 and 4. Therefore, the assembly between wall 108 and divider 129 may be completely hidden to limit or eliminate the visibility of the assembly between wall 108 and divider 129.

As best shown in the top plan view of FIG. 3, a water fill aperture 140 is provided on the walls of the first reservoir 130 for the feeding of water therethrough into the first reservoir 130; for instance, in the present embodiment, the water fill aperture 140 is provided on vertical partition 128*a*. Outside the first reservoir 130, and more particularly, inside the auxiliary space 160, a threaded, compression, or push-fit male fitting 142 is threadingly, compressionally, or push-fit connected to the water fill aperture 140 and to a user-operable, on-off supply valve 144. A threaded, compression, or push-fit attachment 146 is connected to the supply valve 144 for connecting a flex water supply connection thereto (not shown), to feed water into the first reservoir 130; though not shown, the walls of the body 102 (e.g. the rear wall 126 in the area of the auxiliary space 160) may include an orifice for the passing therethrough of the flex water supply connection. In the first reservoir 130, a float valve assembly 148 is operably connected to the water fill aperture 140 to shut the water fill aperture 140 when the water level inside the first reservoir 130 reaches a predetermined water level and prevent a further intake of water through the water fill aperture 140 into the first reservoir 130, for purposes that will be hereinafter described.

Figure 6:
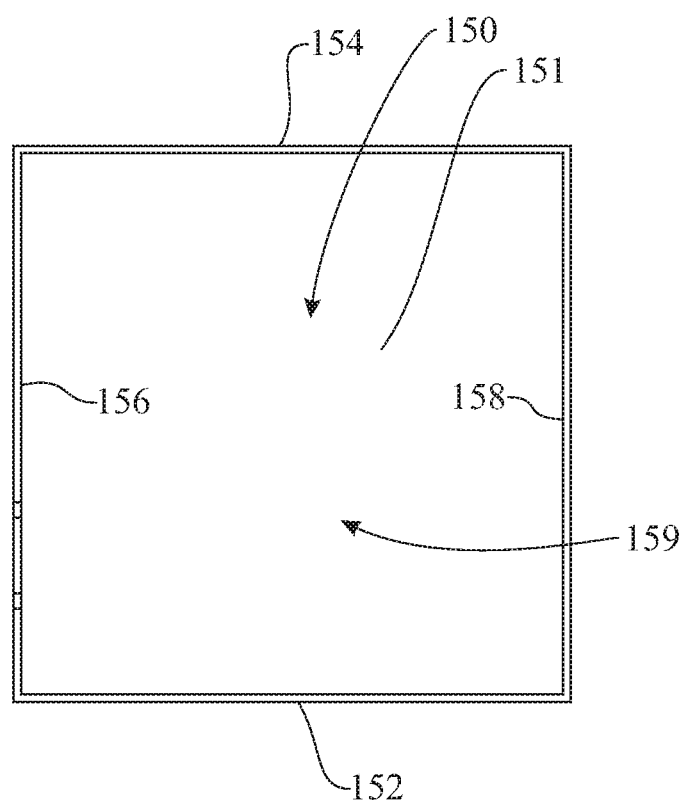
FIG. 6 presents a top plan view of the second reservoir of the water fountain of FIG. 1.
Figure 7:
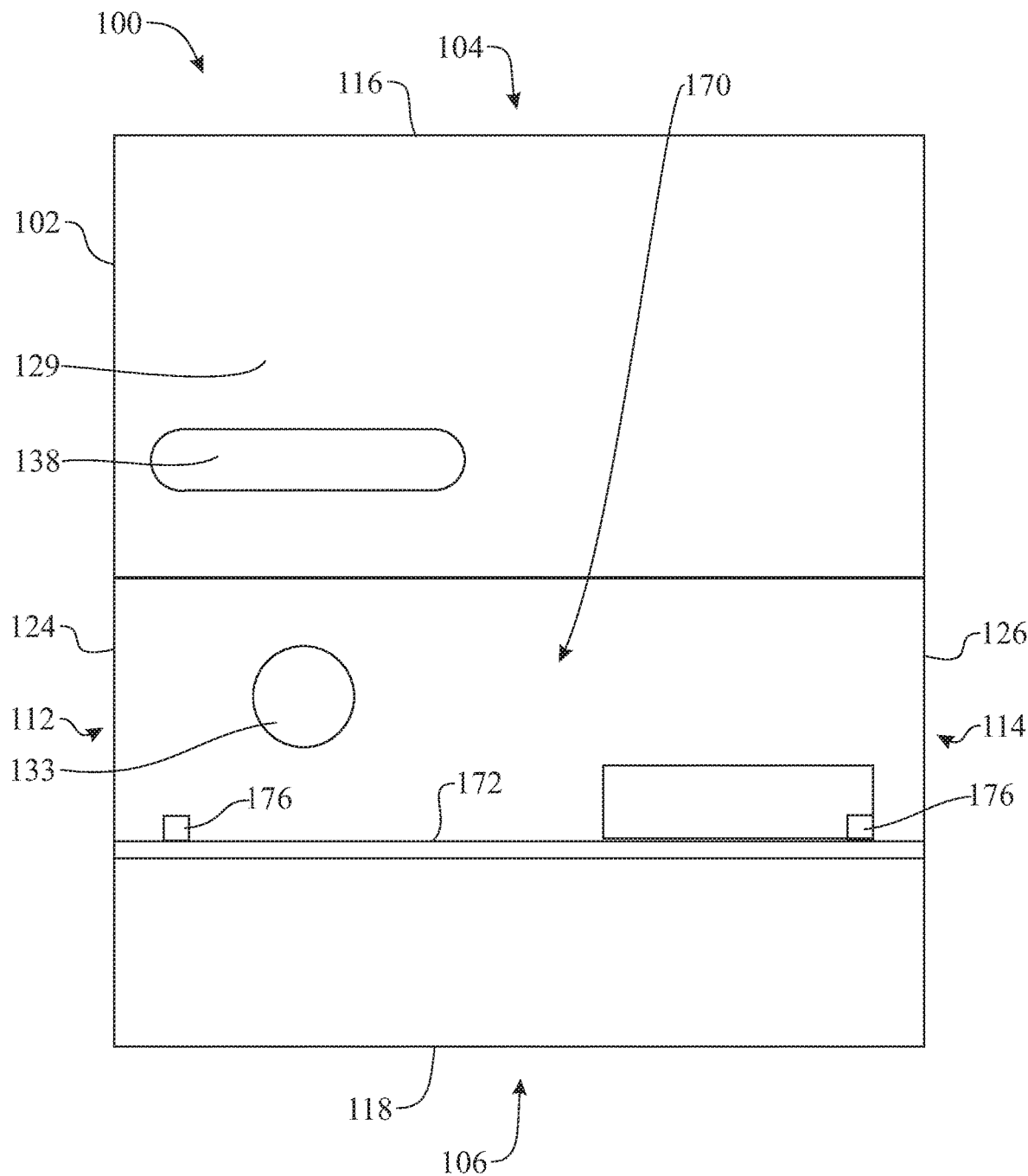
FIG. 7 presents a cross-sectional right side elevation view of the water fountain of FIG. 1, the cross-section taken along section plane 7-7 indicated in FIG. 3, the second reservoir having been omitted.
Figure 8:
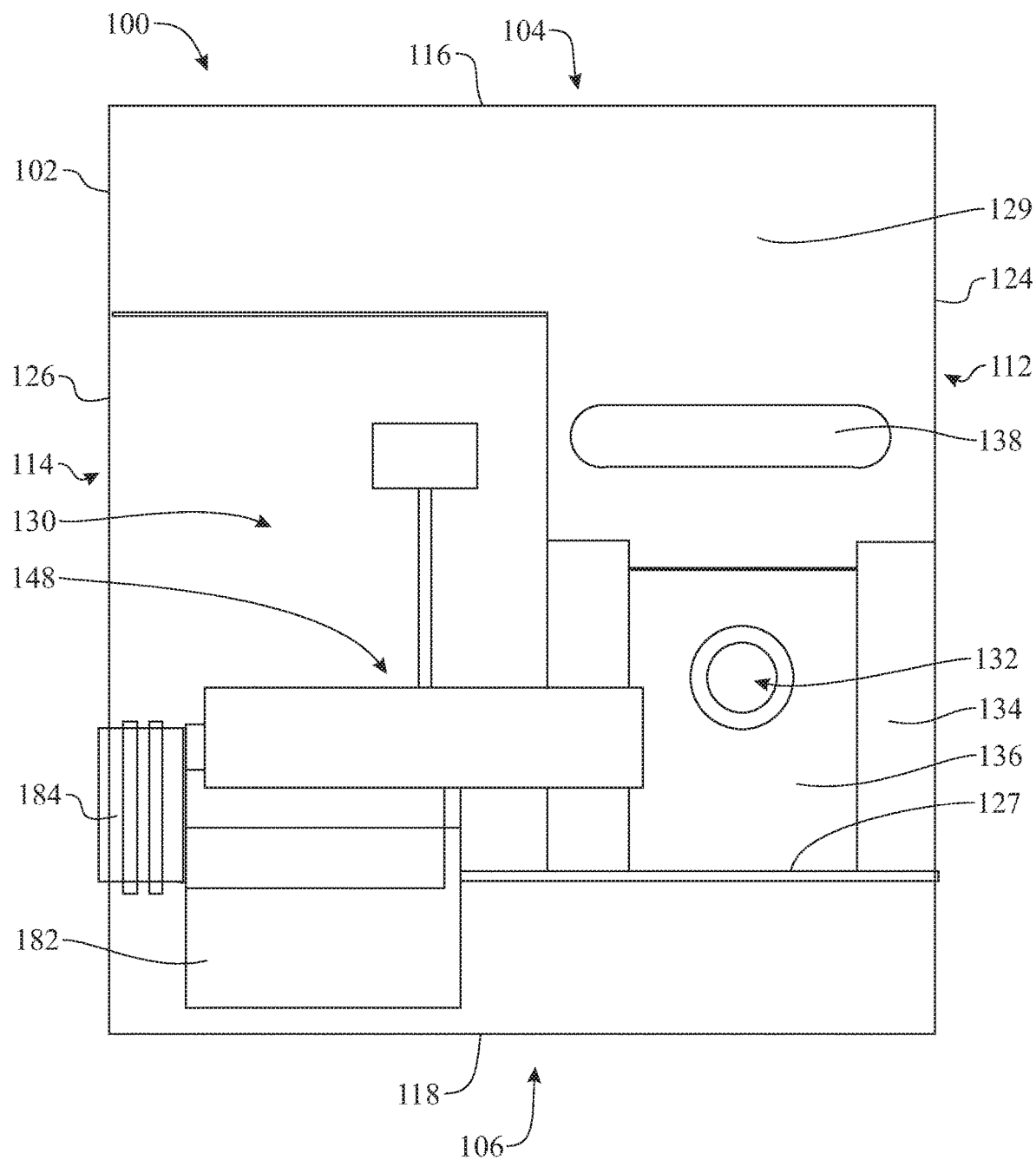
FIG. 8 presents a left side elevation view of the water fountain of FIG. 1, having omitted the right side wall of the water fountain.

On the right side 110 of the body 102, a second reservoir 150 for receiving water is formed. The second reservoir 150 is formed as an open container providing an access point allowing animals to drink therefrom. The open container or second reservoir 150 is preferably removable from the body 102 and washable. The illustration of FIG. 6, for instance, shows the removable second reservoir 150 alone, in top plan view. In the present embodiment, the second reservoir 150 is rectangular or square, having a rectangular or square floor 151 and a front wall 152, a rear wall 154, a left sidewall 156 and a right sidewall 158 extending upward from the floor 151, delimiting a space 159 which is accessible through a top opening 159a. However, alternative embodiments are contemplated in which the shape of the second reservoir 150 may change; for instance, the second reservoir 150 may be cylindrical or hexagonal (i.e. provided with a round or hexagonal floor).

Also at the left side 108 of the body 102, a third reservoir 170 for receiving water is formed. The third reservoir 170 is formed as an open container for removably housing the second reservoir 150 therein. In the present embodiment, the third reservoir 170 is rectangular or square, delimited by the front wall 124, rear wall 126, divider 129 and right side wall 122, and having a rectangular or square floor 172, all of which delimit a space 174 for receiving the second reservoir 150. However, alternative embodiments are contemplated in which the shape of the third reservoir 170 may change; for instance, the third reservoir 170 may be cylindrical or hexagonal (i.e. provided with a round or hexagonal floor). The second reservoir 150 is removably and non-tightly housed within the space 174 of the third reservoir 170, and a gap is left for the passing of water between the second reservoir 150 and walls of the third reservoir 170. Preferably, as best shown in FIG. 4, the floor 151 of the second reservoir 150 is elevated and spaced apart from the floor 172 of the third reservoir 170, for instance by having the second reservoir 150 supported on several standoff supports 176. In some embodiments, the standoff supports 176 can be height adjustable to allow leveling and stabilizing the second container 150. Furthermore, the third reservoir 170 is provided with a waste water aperture or drain 180, which is in fluid communication with the space 174 of the third reservoir 170. The drain 180 is in fluid communication with a P-trap 182 and a ribbed or threaded, compression, or push-fit or smooth drain connection 184, the latter arranged at or extending through the rear wall 126 of the body 102 and providing a connection to a sanitary drain (not shown). In this way, water received from the drain 180 may be expelled out of the water fountain 100.

Figure 5:
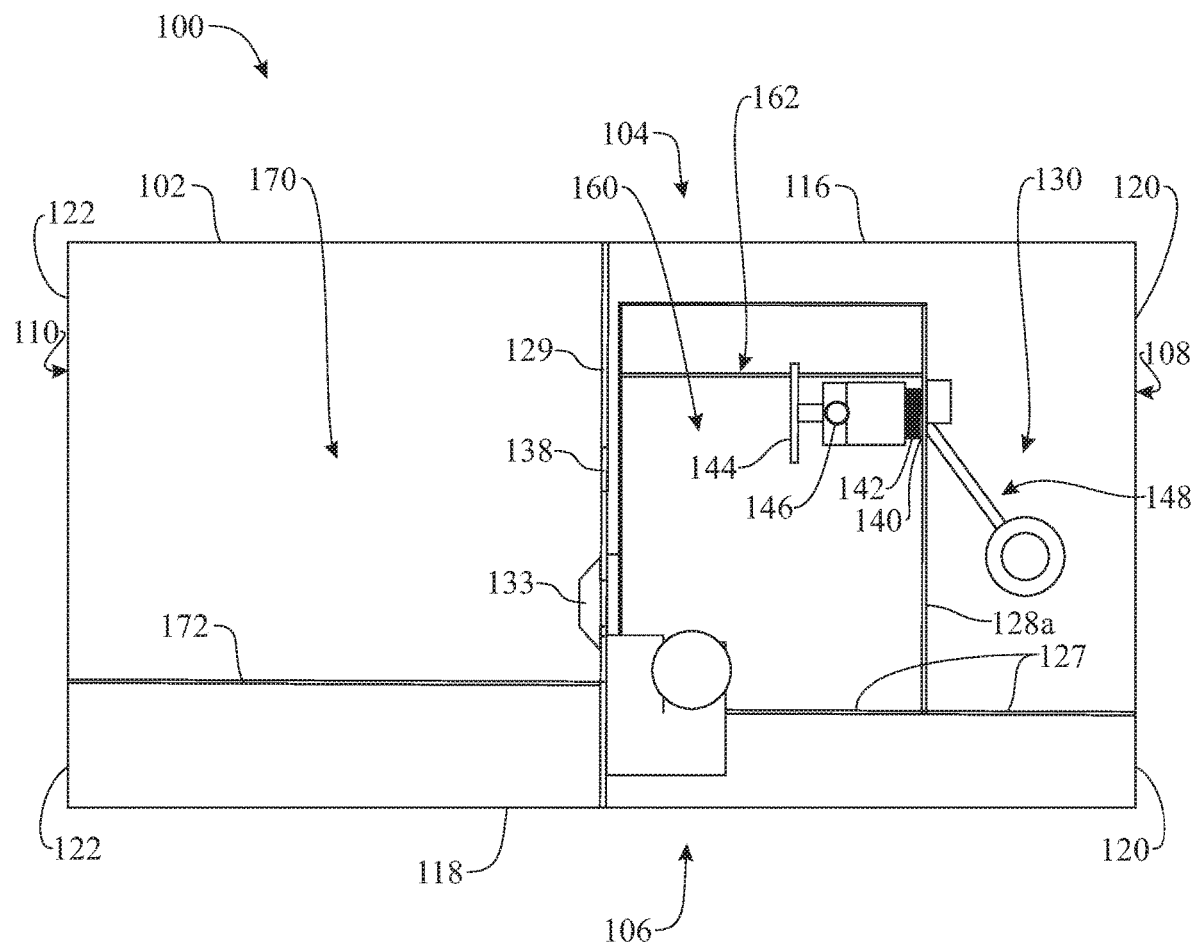
FIG. 5 presents a schematic rear elevation view of the water fountain of FIG. 1, showing internal components of the water fountain.

As shown in FIGS. 3 through 5, the first reservoir 130 is in fluid communication with the second reservoir 150 via a fluid transfer opening 132 allowing fluid to travel from the first reservoir 130 to the second reservoir 150 by way of an unobstructed pressurized connection. A bushing grommet seal 133, also shown in FIGS. 1 and 2, is provided at the fluid transfer opening 132, allowing fluid transfer without leakage therethrough from the first reservoir 130 into the third reservoir 170. Fluid transfer through the fluid transfer opening 132 and the bushing grommet seal 133 maintains fluid level relationship between the first reservoir 130 and the third reservoir 170—e.g., such that the respective fluid levels in the first and second reservoirs are substantially balanced or equalized. As shown in FIG. 3, a filter holder 134 holds a water filter 136 across the fluid transfer opening 132 to filter water passing through the fluid transfer opening 132 and to thus ensure clean filtered water is transferred from the first reservoir 130 to the second reservoir 150. It is to be understood that the grommet seal 133 may include magnetic components to create the seal. For example, circular magnets with a diameter such as between $\frac{1}{8}^{th}$ of an inch thick to $\frac{3}{16}^{th}$ of an inch thick, and axially magnetized, may be located at the grommet seal 133 to create the seal and conversely to not allow grass or debris from the pets mouth (e.g. while the pet is drinking) to be introduced back into and contaminate the first reservoir. The seal may be created by two of such magnets being incased in a silicone rubber soft material.

In addition, the first reservoir 130 is in fluid communication with the third reservoir 170 and/or the second reservoir 150 via an overflow opening 138, best shown in FIGS. 1 and 4, in order for water in the first reservoir 130 reaching the overflow opening 138 to automatically overflow into the third reservoir 170 and/or the second reservoir 150. The overflow opening 138 is arranged higher than the fluid transfer opening 132 and a top end of the second reservoir 150, so that fluid is normally transferred from the first reservoir 130 to the second reservoir 150 through the fluid transfer opening 132, and only flows into the third reservoir 170 via the overflow opening 138 in the event that the fluid level is has overcome the fluid transfer opening 132 and is undesirably high, or if the valve configuration is malfunctioning.

In operation, water is fed into the first reservoir 130 via the water fill aperture 140, and into the second reservoir 150 via the fluid transfer opening 132 and bushing grommet seal 133, until the level of water is substantially the same in the first and second reservoirs 130, 150 and has reached a predetermined water level which is sufficiently high for an animal to drink from the second reservoir 150. The float valve assembly 148 is adjusted so that it shuts the water fill aperture 140 once this predestined water level is reached; thus, once water level in the first and second reservoirs 130 and 150 reaches the predetermined water level, the float valve assembly 148 shuts the water fill aperture 140 and water is no longer fed into the first reservoir 130, allowing water to remain at the predetermined water level and rendering the water fountain 100 ready for use. The second reservoir 150 holds the water openly, allowing an animal to access the water and drink from the open, second reservoir 150. As water is consumed or evaporated from the second reservoir 150, water level in the first and second reservoirs 130 and 150 descends from the predetermined water level and the float valve assembly 148 responsively opens the water fill aperture 140 allowing water to once more enter the first reservoir 130. In consequence, the second reservoir 150 automatically refills from the first reservoir 130 until reaching the predetermined water level and again shutting off water supply into the first reservoir 130. Thus, water is safely and automatically fed into the water fountain 100, guaranteeing drinking water is permanently available in the second reservoir 150 for animal consumption. Water that may be eventually splashed over the side of the second reservoir 150 falls into the third reservoir 170 and flows down into the drain 180, P-trap 182 and out the sanitary drain (not shown). Furthermore, should the float valve assembly 148 malfunction or water feeding through the water fill aperture 140 remain accidentally uninterrupted for whatever reason, water from the first reservoir 130 will overflow through the overflow opening 138 into the drain 180.

Thus, the water fountain 100 disclosed herein provides a self-filling, self-draining, permanent and safe water source for pets to drink from. Furthermore, having the water fountain 100 include an integrated P-trap 182 presents several particular advantages. First, the risk of sewer gas escaping into the owner's property is eliminated. In addition, integrating the P-trap 182 eliminates the need to have a plumber install a traditional P-trap fitting that would be costly from a time and material standpoint. Furthermore, when integrating the P-trap 182, the second reservoir 150 is preferably arranged substantially higher than the P-trap 182 and is therefore more easily accessible by and healthier for animals for drinking water therefrom.

This perpetual well or water fountain 100 may be constructed in various sizes, shapes and materials and used by animals of any and all sizes. For instance, the body 102 and second reservoir 150 may be constructed and comprised of plastic, fiberglass, composite materials, stainless steel, and or any suitable material known or later discovered and compatible with water (e.g., BPA-free). In some embodiments, the second reservoir 150 may be dishwasher safe. The shape of the embodiment may be square, rectangular or round or any configuration deemed necessary to make the devise most effective. The height of the embodiment may be adjusted by affixing to the wall or the use of legs or a base constructed to meet a certain need. For example, a step may be included to help or allow smaller pets access the drinking supply.

Preferably, the top wall 116 of the body 102 is at least partially openable to allow a user to access the first reservoir 130 and auxiliary space 160 for repairing, maintaining, replacing or operating the float valve assembly 148, water filter 136, supply valve 144 or other internal components of the water fountain 100. For instance and without limitation, the top wall 116 may be hinged and pivotably openable. In other embodiments, such as the embodiment depicted herein, the top wall 116 is separable, the illustration of FIG. 2 showing the water fountain 100 in top plan view with the top wall 116 in place, and the illustration of FIG. 3 showing the water fountain 100 in top plan view with the top wall 116 removed in order to reveal internal components of the water fountain 100. The assembly from wall 108 to wall 129 may be mounted inside the wall cavity between wall 108 to wall 129.

Referring now to a preferred form of the invention illustratively disclosed in FIGS. 9-15, a drinking assembly designed for use by animals, particularly residential pets such as cats and dogs is generally shown. The assembly includes an open, reservoir-like drinking vessel in combination with a housing unit configured to removably hold the drinking vessel. In one form, the drinking vessel is removably seated in the housing unit. The drinking vessel is the location where the animal accesses water contents available for drinking, similar in functionality to a watering trough. The assembly features a fountain-like operation in terms of automatically furnishing the drinking vessel with a continuous amount of drinking fluid. A supply container integral with the housing unit is disposed in fluid communication with the drinking vessel, following assembly and installation. The supply container is adapted for fluid connection to a permanent and perpetual source of water, such as the plumbing water line in a residential home. Water provided to the supply container is continuously available to the drinking vessel, though it is regulated and controlled by a water control mechanism such as a float and valve assembly. The housing unit is provided with various overflow protection features that drain excess or surplus water in the event of overflow from the drinking vessel. These features also address unexpected increases in the water level of the supply container, which otherwise would overwhelm the water storage capacity of both the drinking vessel and the supply container (e.g., due to failure of the float and valve assembly).

Figure 9:
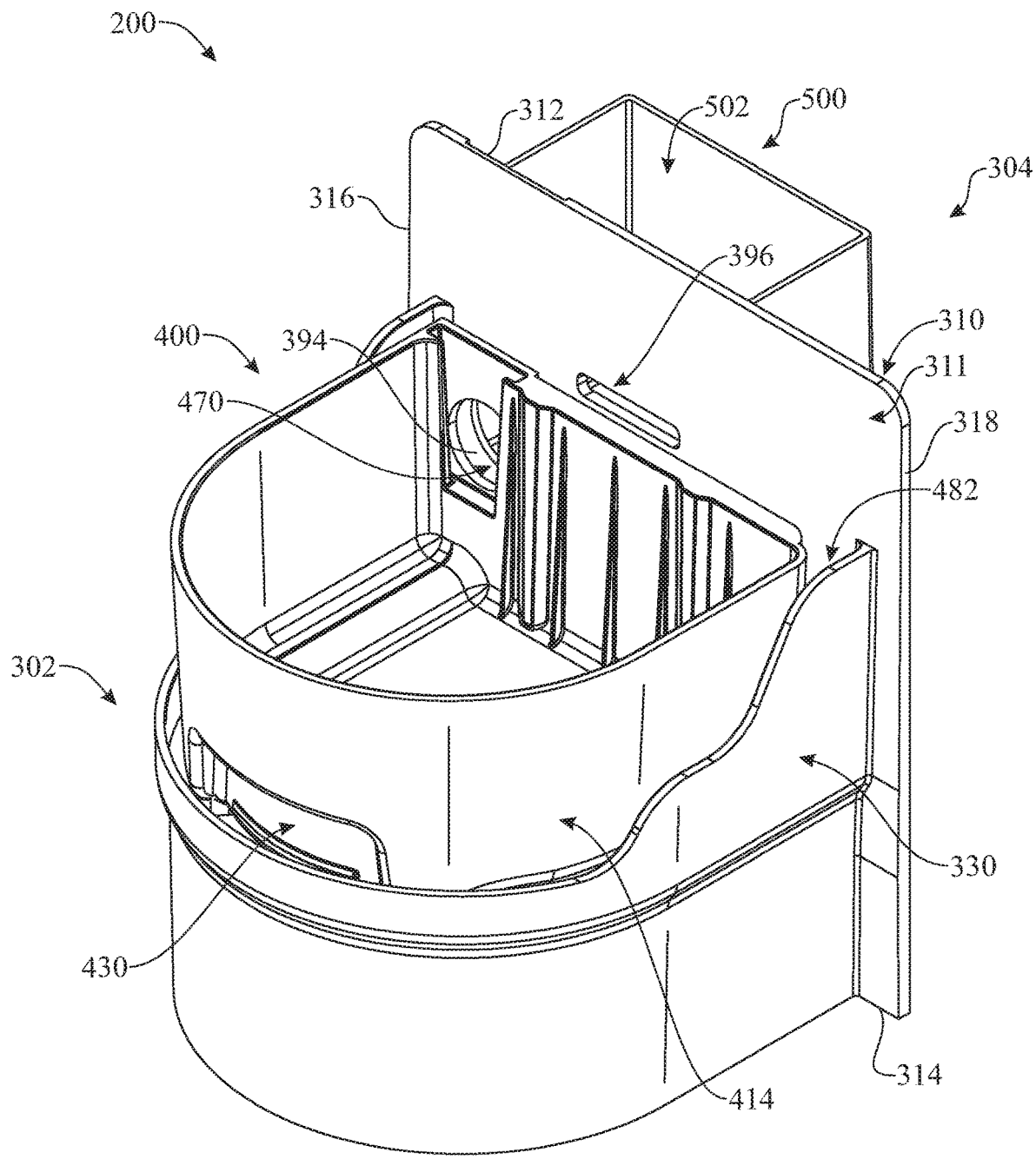
FIG. 9 is a front, right-side, upper perspective view of the fully integrated animal drinking assembly, according to another embodiment of the present invention.
Figure 10:
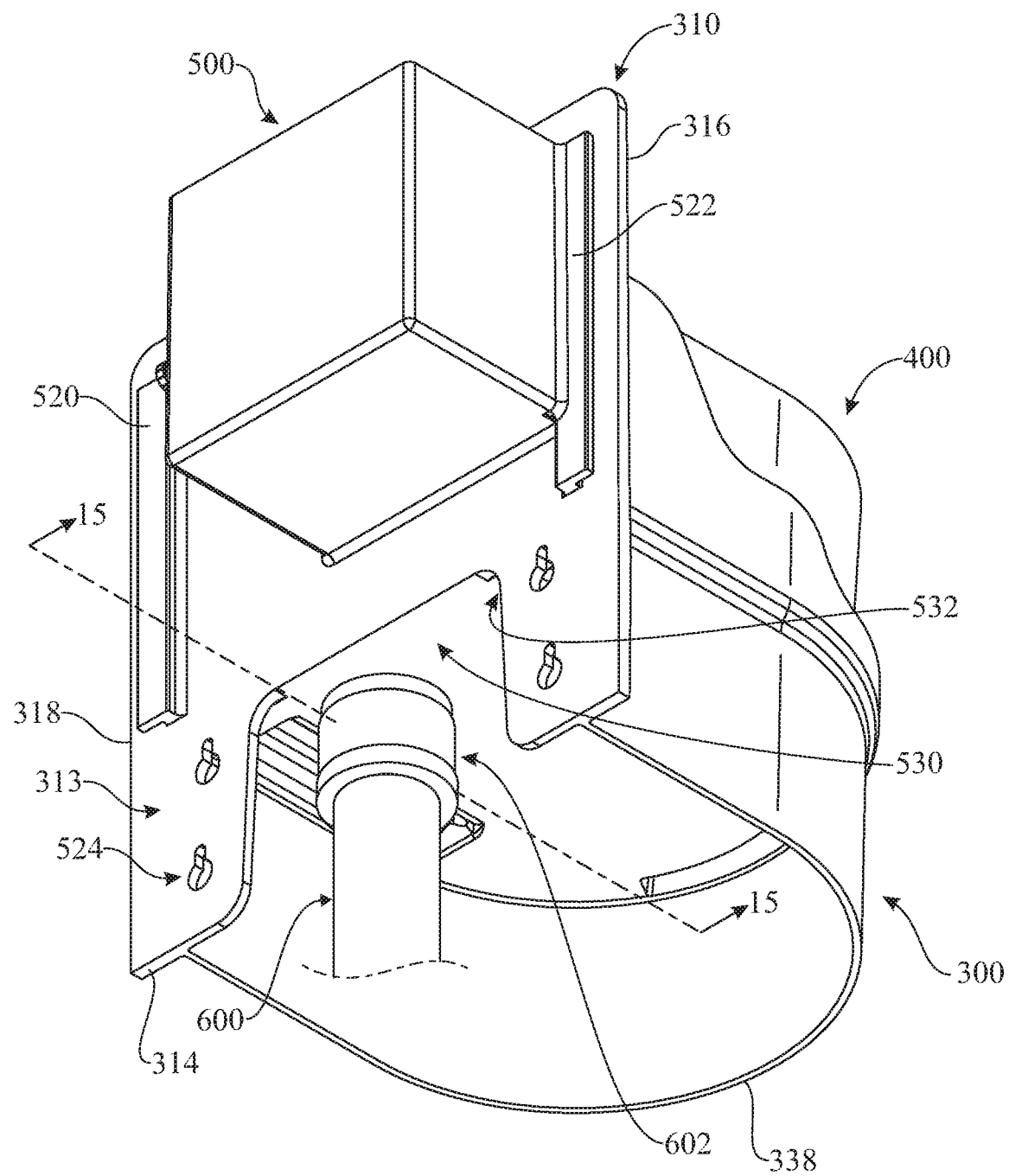
FIG. 10 is a rear, left-side, bottom perspective view of the drinking assembly originally introduced in FIG. 9, illustrating the overflow drainage line disposed at the underside of the assembly.
Figure 11:
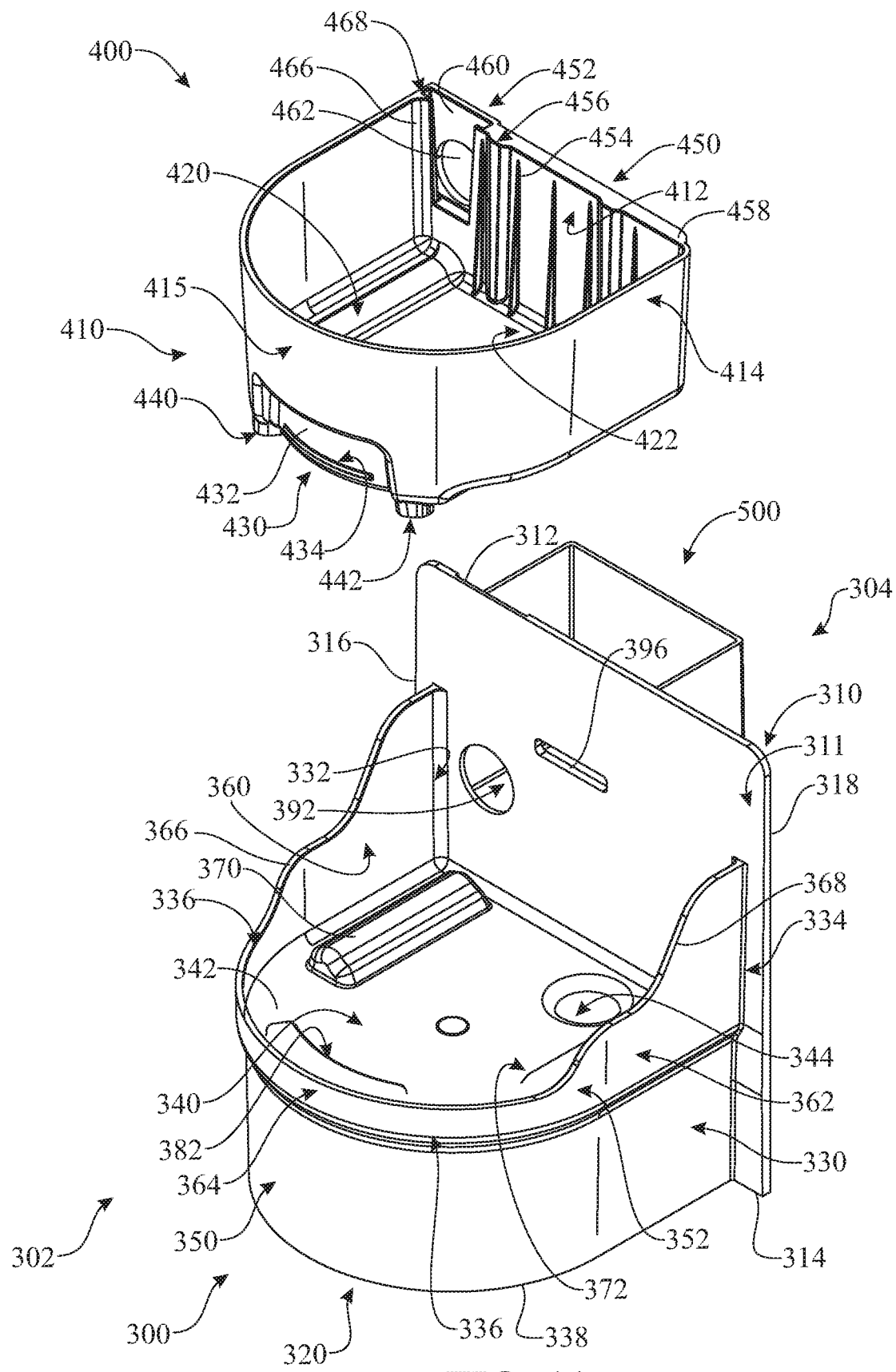
FIG. 11 is an exploded perspective view of the drinking assembly of FIG. 9, illustrating the separation of the drinking vessel from the housing unit.

Referring now to FIGS. 9-15, with initial emphasis on FIGS. 9 and 11, there is disclosed an animal drinking assembly 200 that includes, in combination, a first subassembly or housing unit 300; a second subassembly or drinking vessel 400; and, a water supply container 500 integral with housing unit 300, according to a preferred embodiment of the present invention. Briefly, in overview, the assembling of drinking assembly 200 involves the removable seating of drinking vessel 400 in housing unit 300 (FIG. 9). In this seated relationship, drinking vessel 400 is disposed in fluid communication with supply container 500, which is configured to receive a continuous supply of water from a perpetual source, such as the water line in a residential home. During operation, water contained in supply container 500 flows into drinking vessel 400 (FIG. 12), where it is accessible and available to an animal, such as a domestic pet in a residential installation. In various alternate implementations, the assembled drinking assembly 200 can be installed as a drinking fixture in a variety of suitable locations, such as in a cabinet space or as a wall-mounted arrangement in a residential dwelling (FIG. 12) where access to existing water lines is possible. The present invention incorporates a variety of fixed, passive mechanical features (i.e., no moving parts or manual adjustments) that are embodied in housing unit 300 and drinking vessel 400, which interact and cooperate to provide various functions, such as the guided positioning of drinking vessel 400 in housing unit 300 and the control and management of water overflow.

Referring to FIG. 11, the housing unit 300 preferably has a solid, one-piece unitary construction, which includes the integral formation of supply container 500. The housing unit 300, for example, can be fabricated according to a molded plastic process, a conventional procedure well known to those skilled in the art. The housing unit 300 includes a generally upright, planar, and vertical back-wall, partition or headwall 310 that separates, divides, and otherwise partitions housing unit 300 into a front side generally illustrated at 302 and a rear side generally illustrated at 304. The headwall 310 has a generally rectangular shape and includes a front surface 311, a rear surface 313, an upper edge 312, a lower edge 314, a left edge 316, and a right edge 318. In broad terms, the front side 302 generally defines the location of drinking assembly 200 where an animal is able to access drinking water from drinking vessel 400, which during assembly is mounted in a seating or nesting relationship to housing unit 300 (FIG. 9). The rear side 304 generally defines the location of drinking assembly 200 where a supply of water is sourced from supply container 500. During operation, fluid communication is available from supply container 500 to drinking vessel 400 via a fluid port formed in headwall 310. Due to the direction of water flow, supply container 500 is regarded as a source or primary reservoir, while drinking vessel 400 is regarded as a destination or secondary reservoir.

At its front side 312, housing unit 300 includes a body 320 generally configured in an upright, standing, seat-like formation to receive drinking vessel 400. In particular, body 320 is configured in the form of a base having a support-type seating platform or seat-like formation 340. The body 320 includes a generally curved, upright sidewall 330 and a seat or platform 340 circumscribed at its periphery by sidewall 330. The seat 340 extends in cantilever-like fashion from the front surface 311 of headwall 310. The curving sidewall 330, at its opposite terminal ends generally illustrated at 332, 334, joins to and extends from the front surface 311 of headwall 310. The sidewall 330 has a generally U-shaped profile in horizontal cross-section. In a preferred form, the headwall 310 is wider than the widest dimension of sidewall 330.

With continued reference to FIG. 11, the sidewall 330 of housing unit 300 includes a lower portion generally illustrated at 350, an upper portion generally illustrated at 352, and a shoulder-like transition portion generally illustrated at 354 that joins the upper portion 352 to the lower portion 350. The transition portion 354 is configured so that the upper portion 352 overhangs or extends further out than the lower portion 350. In one form, this relative extension between portions 350, 352 describes an offset of upper portion 352 relative to lower portion 350, wherein the offset is defined by transition portion 354. In this manner, the upper portion 352 of sidewall 330 defines a projecting rim or lip feature. The transition portion 354 extends continuously between the terminal ends 332, 334 of sidewall 330. In one form, transition portion 354 lies generally in the same plane as seat 340; upper sidewall portion 352 lies generally above the plane line of seat 340; and, lower sidewall portion 350 lies generally below the plane line of seat 340. The sidewall 330 is configured to ring, circumscribe, surround, encircle, and peripherally span seat 340; in this peripheral configuration, sidewall 330 remains contiguous with seat 340.

Figure 14:
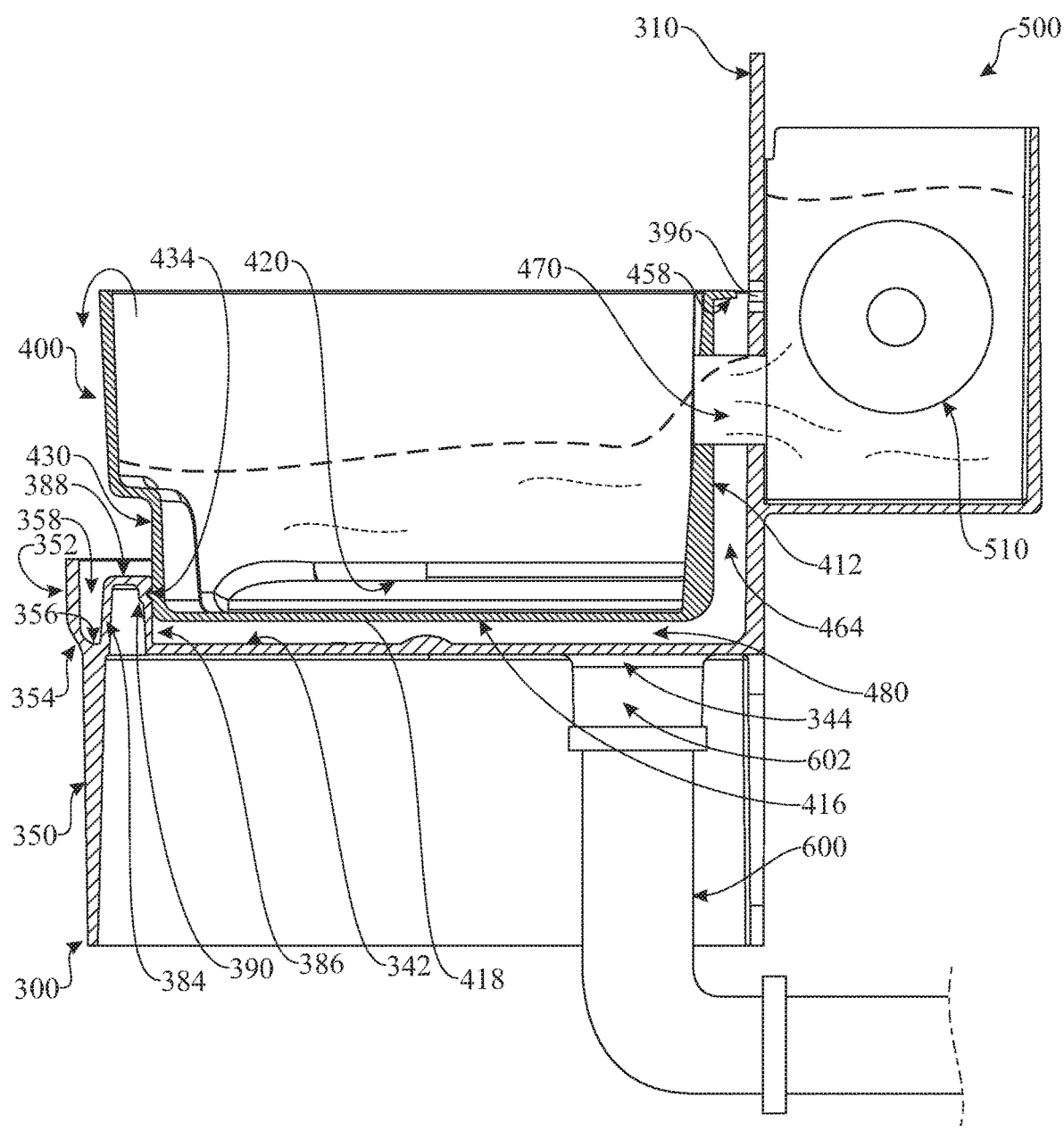
FIG. 14 is a cross-sectional right side elevation view of the drinking assembly of FIG. 9, taken along the cross-sectional plane 14-14 depicted in FIG. 12, illustrating how water is transferred from the primary reservoir to the drinking vessel.

Referring now to FIGS. 11 and 14, at the interior side of sidewall 330 where seat 340 is present, the shoulder-like transition portion 354 forms a narrow peripheral shelf 356 (see FIG. 14) that extends continuously along the peripheral border of sidewall 330 and defines a gap or clearance space 358. In one form, the narrow peripheral shelf 356 has a flared or tapering profile. During assembly when drinking vessel 400 is mounted in housing unit 300 on seat 340, the footprint or coverage of drinking vessel 400 relative to seat 340 is smaller such that vessel 400 abuts but does not extend into the narrow peripheral shelf 356, which is left as the immediately adjacent border region surrounding the seated drinking vessel 400 (FIG. 14). As a result, any spillage or overflow from drinking vessel 400 will pour directly into the space of the narrow peripheral shelf 356 underneath, where it can be conveyed away via a drainage feature (discussed further). The combination of drinking vessel 400 and housing unit 300 is appropriately sized and dimensioned to facilitate this relationship specifying the different coverage footprints, in order to leave the space of narrow peripheral shelf 356 available to directly receive and collect overflow.

The sidewall 330 includes a ridge-like top edge 336 and a support-like bottom edge 338. The top edge 336 defines the upper terminus of the upper portion 352 of sidewall 330, while the bottom edge 338 defines the lower terminus of the lower portion 350 of sidewall 330. In a preferred form, the bottom edge 338 of sidewall 330 is contiguous, flush and coplanar with the lower edge 314 of headwall 310, so that housing unit 300 can be situated on a flat surface in a stable standing position resting on these edge features 314, 338, if needed (See FIGS. 10 and 11).

Referring now to FIGS. 9 and 11, the upper portion 352 of sidewall 330 includes a pair of raised end sections generally illustrated at 360, 362, which transition at their low point to join opposite ends of a level intermediate or mid-section 364. The raised end sections 360, 362 define opposite ends of the upper sidewall portion 352. The raised end sections 360, 362 exhibit an inclined, elevated or sloping formation. The top edge 336 of sidewall 330 includes a pair of variable-height upper edge sections 366, 368 each spanning or coextensive with the pair of raised end sections 360, 362, respectively. The edge section 366 defines the upper edge of raised sidewall end section 360; and, the edge section 368 defines the upper edge of raised sidewall end section 362. Each variable-height edge section 366, 368 features a descending gradient moving away or retreating from vertical headwall 310 (i.e., edge sections 366, 368 fall or slope downwards); conversely, each variable-height edge section 366, 368 features an ascending gradient moving towards or approaching vertical headwall 310 (i.e., edge sections 366, 368 rise or slope upwards). The upper edges 366, 368 of raised sidewall end sections 360, 362 have an uneven, curvilinear profile. In one form, the upper edges 366, 368 have a scalloped profile characterized by a wave-like surface undulation. The raised end sections 360, 362, in view of their ascending feature as the sidewall 330 approaches its junction with vertical headwall 310, have their highest portion joined to headwall 310. This relationship of the raised end sections 360, 362 to headwall 310 provides a rigid, bracket-like support to headwall 310 that maintains its integrity. The benefit of providing this rigidity to headwall 310 is especially evident during and following installation of assembly 200, when assembly 200 is secured in place by mounting headwall 310 to a house fixture such as a wall or cabinet structure, a method of installation requiring headwall 310 to be durable and well-supported (FIG. 9). The changing, variable profile of upper edges 366, 368 can be fashioned in various alternate forms defining different types of gradual, progressive, cumulative ascent/descent.

Turning now to FIGS. 10, 11, 14 and 15, the seat 340 has a generally planar formation that includes an upper side or surface 342. A drainage hole 344 is formed in surface 342 that serves as a collection point for draining overflow water collected on surface 342. The drainage hole 344 can be connected to any suitable plumbing fixtures well known to those skilled in the art, such as a p-trap overflow arrangement.

The seat 340 further includes, in combination, a set of seat-locating and vessel-positioning landmark features disposed on surface 342, which facilitate the positioning, registration, alignment, and guided location of drinking vessel 400 onto seat 340. These landmark features include a pair of raised, convex male-type relief rails 370, 372, which mate with corresponding concave features 420, 422 formed in the bottom side 416 of drinking vessel 400. During mounting of the drinking vessel 400 to the housing unit 300 at seat 340, the mating engagement between the concave features 420, 422 and the convex features 370, 372 define a positioning, locating, and guiding interface for drinking vessel 400 relative to housing unit 300. These landmark features further include a raised, bench-like curb or retaining structure 380 configured to establish a forward position for the seated drinking vessel 400 and retain it in place using a removable, press-fit locking engagement (discussed further).

Each one of the convex relief rails 370, 372 has a generally elongate, raised body oriented longitudinally, extending in a front-to-back direction. The convex rails 370, 372 are spaced-apart in opposing, parallel arrangement at respective lateral sides of seat 340. The convex rails 370, 372 have uniform cross-sections and have the general formation of a protuberance extending from the upper surface 342 of seat 340. The convex feature of rails 370, 372 can take a variety of forms suitable to function in a general tongue-and-groove style with corresponding, complementary concave features formed at the bottom side of drinking vessel 400, in order to properly position and locate drinking vessel 400 within housing unit 300 in its seated relationship on seat 340. In one form, for example, the cross-sectional profile of convex rails 370, 372 will exhibit a generally triangular feature having sides with a rolling curvature, which creates numerous and varying contact points (surfaces) with the complementary concave features and so promotes a firm mutual engagement between drinking vessel 400 and housing unit 300 at seat 340. Additionally, the convex rails 370, 372 serve to automatically guide and position drinking vessel 400 within housing unit 300, simply by fitting the concave features at the underside of drinking vessel 400 onto the convex rails 370, 372. By so doing, drinking vessel 400 is automatically located in its proper seating position.

With particular reference to FIGS. 9, 11 and 14, the retaining structure 380 is disposed at a generally central, frontward location of seat 340, immediately behind and adjacent the gap 358 defined by the narrow peripheral shelf 356 formed by transition sidewall portion 354. The retaining structure 380 includes an elongate, raised or elevated body 382 having a curvature that follows the contour of curving sidewall 330. The retaining structure 380 is configured as a protuberance relative to the upper surface 342 of seat 340. The body 382 has a generally rectangular lateral cross-section. The body 382 includes a front side 384, a rear side 386, and a top side 388 from which sides 384, 386 extend downwards. The body 382 includes a generally lateral depression or groove 390 formed in rear side 386 and extending from one end of body 382 to another. In one form, groove 390 is characterized as a concave relief feature. As discussed further, the retaining groove 390 mates and engages with a corresponding ridge or projection formed in drinking vessel 400, providing a means to removably secure drinking vessel 400 to housing unit 300 and retain it in place during operation, resisting movement. The retaining structure 380 functions as a limit or stop feature that specifies the seated position of drinking vessel 400 and resists/arrests any additional longitudinal movement of drinking vessel 400 in the forward direction.

The vertical headwall 310 of housing unit 300 includes a generally circular aperture, hole, or fluid transfer opening 392 that opens at the rear side 304 of housing unit 300 directly into the interior of water supply container 500. A grommet 394 is fitted into transfer opening 392. The grommet 394, in one form, has a frusto-conical shape, with the apex or reduced diameter portion on the front side 302 of housing unit 300. This tapering profile of grommet 394 facilitates a firm sealing engagement with an aperture formed in the backside of drinking vessel 400. The transfer opening 392 facilitates fluid communication between water supply container 500 and drinking vessel 400. The fluid transfer opening 392 is placed at a suitable location (particularly height) to enable fluid conveyed through it to flow appropriately into drinking vessel 400, once it is installed. The vertical headwall 310 further includes a generally laterally extending overflow slot 396 that opens at the rear side 304 of housing unit 300 directly into the interior of water supply container 500. The overflow slot 396 is sized, dimensioned, and located at a specific height according to factors relating to the operation of the float valve assembly that regulates the amount of water in supply container 500 (e.g., gallons per minute flow rate). In the event of float valve failure or other condition in which the water level of supply container 500 rises beyond a prescribed threshold, threatening an overflow on either side 302, 304 of housing unit 300, the water level can be controlled and flooding avoided by the passage of water through slot 396 once the water level in container 500 reaches slot 396. The slot 396 functions as an overflow relief feature similar to the overflow drain slot in sinks. Overflow water passing through slot 396 tracks downward and along the front surface 311 of headwall 310, eventually reaching drainage hole 344 formed in seat 340.

Referring still to FIGS. 9 and 11, the drinking vessel 400 defines an open container, basin or water-holding receptacle having a body generally illustrated at 410 comprising a back wall 412, a curved sidewall 414, and a bottom 416. The curved sidewall 414, in one form, has a generally U-shaped profile that generally conforms, in terms of same shape but proportionally different size, to that of curved sidewall 330 of body 320 of housing unit 300, i.e., curved sidewall 414 is a reduction-type dilation of curved sidewall 330. It is a preferred feature, in consideration of the design of housing unit 300 and drinking vessel 400, that the spans or coverage footprints/profiles of their respective sidewalls 330, 414 are proportionally scaled to one another. For example, the footprint of curved sidewall 414 of drinking vessel 400 is sized and dimensioned relative to that of curved sidewall of housing unit 300 so that once drinking vessel 400 is mounted in housing unit 300, a uniform spacing is provided between the inner nested sidewall 414 and outer nested sidewall 330. This uniform spacing is defined by the clearance gap 358 and 482 (See FIGS. 9 and 14 for clarity). The curved sidewall 414 has a front section generally illustrated at 415 that generally spans the trough of the U-shaped profile.

The bottom 416 of body 410 of drinking vessel 400 includes a pair of concave female-type relief features or rails 420, 422 formed at a lower surface or underside of bottom 416 (which appear as convex features from the upper elevation interior view of FIG. 11). The pair of concave relief rails 420, 422 are arranged in a spaced-apart, opposing and parallel relationship. These concave relief rails 420, 422 have a complementary form and structure to the convex relief rails 370, 372 formed at the upper side 342 of seat 340 of housing unit 300. Additionally, the concave relief rails 420, 422 are suitably located so that they fit and otherwise mate with the pair of convex relief rails 370, 372 provided in seat 340 of housing unit 300, upon installation. Accordingly, during assembly, when drinking vessel 400 is maneuvered into place over seat 340 and mounting is attempted to housing unit 300, the concave relief rails 420, 422 assist in locating drinking vessel 400 in place in view of the mating engagement that fits the concave relief rails 420, 422 onto the convex relief rails 370, 372. These concave relief rails 420, 422, in cooperation with convex relief rails 370, 372, help guide the placement and positioning of drinking vessel 400 within housing unit 300.

With continuing reference to FIGS. 11 and 14, the drinking vessel 400 further includes an indentation or recess generally illustrated at 430 that is formed at a generally central location of the front section 415 of curved sidewall 414. The indentation 430 is suitably configured to define a handle feature that facilitates the ready lifting and carrying of drinking vessel 400. The indentation 430 includes a recessed surface 432. A laterally extending convex feature or retaining rib 434 is formed at the recessed surface of 432. The retaining rib 434 forms a projection ridge that is matingly complementary to the retaining groove 390 formed in the retaining structure 380 of housing unit 300. During assembly, as drinking vessel 400 is seated in housing unit 300 by moving it downwards into place over and onto seat 340, the retaining rib 434 frictionally engages the area of retaining structure 380 above retaining groove 390 at its rear side 386. The downward movement of drinking vessel 400 is continued until the retaining rib 434 fits into place within retaining groove 390, producing a removable, press-fit locking connection. In this seated relationship, the indentation 430 (at its recessed surface 432) overlaps in a flush engagement with the retaining structure 380 (at its rear side 386), immobilizing and blocking the drinking vessel 400 from any forward movement.

As illustrated in FIG. 11, the drinking vessel 400 further includes a pair of pedestals, spacers or feet 440, 442 generally located at the front corners on both sides of the handle-forming indentation 430. During assembly, the feet 440, 442 rest on the upper side 342 of seat 340 of housing unit 300. The feet 440, 442 provide vertical stability and support to drinking vessel 400 during assembled operation. Additionally, as a spacing feature, the feet 440, 442 ensure that drinking vessel 400 remains elevated relative to seat 340, so that the upper side 342 of seat 340 is clear of any obstructions or impediments to allow any water spillage or overflow that collects on upper side 342 to freely flow to drainage hole 344.

The drinking vessel 400 includes various features integrated with back wall 412. The back wall 412 includes a main support-rendering wall section 450 and an adjoining fluid-admitting portal wall section 452. The main wall section 450 includes a set of spaced-apart, gusset-type rigidity splines 454 formed at an inner surface 456 of main wall section 450. The splines 454, in gusset form, taper or flare outward from top to bottom. The splines 454 have a thin thickness. These splines 454 provide bracket-like support to back wall 412, consistent with the functionality of a gusset formation. The back wall 412 also includes a set of wide, inward-projecting, convex rigidity splines 456 that are interleaved with the set of gusset splines 454. The convex splines 456 cooperate with the gusset splines 454 provide back wall 412 with additional support to maintain its integrity. The combination of narrow gusset splines 454 and wide convex splines 456 provides a measure of strength, support and structure that is distributed across the majority of main wall section 450 of back wall 412. The main wall section 450 of back wall 412 also includes an outwardly extending rim or lip 458 (FIG. 14) that is coextensive with the lateral extent of main wall section 450. This projection lip 458 defines the upper edge or terminus of main wall section 450 and affords, due to its enhanced width compared to the rest of main wall section 450, a measure of rigidity to back wall 412. The rear-located projection lip 458 also defines a continuous shelf that the user, in combination with the handle-forming indentation 430 formed at the front section 415, can employ as grasping points to carry and lift drinking vessel 400 from both the front and back. In an optional feature, the inside corners at the interior of drinking vessel 400 are rounded, in the form of a curved radius, to facilitate ease of cleaning.

Turning now to FIGS. 11 and 14, the back wall 412 includes the fluid-admitting portal wall section 452, which generally occupies the back left corner of drinking vessel 400. The portal wall section 452 includes an offset wall member 460 that is set back (outward direction) or offset from the main wall section 450 of back wall 412. The wall member 460 includes an opening 462 alignable with opening 392 formed in headwall 310 of housing unit 300 during assembly. The opening 462 fits over the grommet 394 installed in opening 392, forming a fluid-tight sealing engagement. The combination of opening 462 formed in drinking vessel 400 (at back wall 412), opening 392 formed in housing unit 300 (at headwall 310), and the intermediate grommet 394 situated in opening 392 cooperates to form a sealed fluid channel 470 (FIG. 14) between supply container 500 and drinking vessel 400. The offset of wall member 460 from the adjacent main wall section 450 produces a gap or clearance 464 between headwall 310 of housing unit 300 and the main wall section 450 of back wall 412 of drinking vessel 400, once drinking vessel 400 is seated in housing unit 300. Since wall member 460 (at opening 462) serves as the point of contact with headwall 310 (at the combination of grommet 394 installed in opening 392), there will always be some amount of spacing or separation between headwall 310 and main wall section 450 of drinking vessel 400, regardless of the degree of advance of grommet 394 through opening 462. The relative positioning of convex relief rails 370, 372 (housing unit 300) and the complementary pair of concave relief rails 420, 422 (drinking vessel 400) also factors into the establishment of clearance gap 464, e.g., convex relief rails 370, 372 are spaced-apart from headwall 310 a sufficient amount to support the formation of clearance gap 464 by forcing the location of drinking vessel 400 into a position featuring such a gap 464.

As shown in FIG. 11, the portal wall section 452 of back wall 412 of drinking vessel 400 is further configured to define a guided, filter-receiving slot generally illustrated at 468. The slot 468 is defined by the offset wall member 460 and a pair of opposing, filter-guiding and retaining track features generally illustrated at 466. The slot 468 is open at the top, allowing a filter (not shown) to be removably slid into slot 468. The slot 468 is on the drinking side of opening 462. A cartridge-type filter installed in slot 468 prevents impurities from flowing back into supply container 500 disposed on the supply side of opening 462. The slot 468 is preferably tapered (e.g., wider at the top than the bottom), in order to facilitate guiding and placement of the filter through slot 468. A set of additional features in back wall 412 (at portal wall section 452) promote sealing among the various parts in fluid channel 470. In one feature, the offset wall member 460 slopes inwardly, which enhances the ability of opening 462 (formed in offset wall member 460) to optimally advance over grommet 394, which is already installed in opening 392 formed in headwall 310 of housing unit 300. The greater advance of opening 462 over grommet 394 promotes a better sealing relationship between them. In another feature, the offset wall member 460 is made with an adequate thickness to give grommet 394 all of the space it can occupy (within dimensional tolerances and limits), once it fits through opening 462 to create the sealing engagement, while also not extending too far on the drinking side of opening 462 so as to impede the insertion or removal of the filter disposed in slot 468.

The fluid supply container 500 can have any of various suitable constructions and configurations compatible with the functionality of a fluid reservoir or receptacle. In one form, for example, container 500 has a generally rectangular shape that is open-ended at the top (FIGS. 9-11). Other shapes are possible. Additionally, though shown with an open top, container 500 can be equipped with different types of lid or cover structures, such as removable, adjustable (pivot open or closed), or fixed, as dictated by environmental factors and user preferences.

With reference to FIGS. 9, 11-15, during assembly, drinking vessel 400 is removably mounted within housing unit 300 in a releasable seating relationship to seat 340. Several features establish a firm, stable, releasable locking engagement between drinking vessel 400 and housing unit 400. At the front end of drinking vessel 400, the indentation 430 is maneuvered downward relative to the retaining structure 380 of housing unit 300 such that the retaining rib 434 (after frictionally sliding downwards across rear side 386 of 380) snaps into place within retaining groove 390 formed in rear side 386 of 380 (see FIG. 14). In this arrangement, the portion of the recessed surface 432 of indentation 430

(proximal retaining rib 434) that overlaps with retaining structure 380 is now disposed in flush, abutting engagement with rear side 386 of retaining structure 380, establishing a tight secure fit for the front end of drinking vessel 440. At the rear end of drinking vessel 400, the securing of drinking vessel 400 to headwall 310 of housing unit 300 takes place by the sealing engagement between opening 462 (formed in offset wall member 460 of back wall 412 of vessel 400) and grommet 394 (fit into opening 392 formed in headwall 310). These attachment features, which releasably connect drinking vessel 400 at its front and back end to housing unit 300, constrain movement of the seated drinking vessel 400, particularly in the lateral (side-to-side) and longitudinal (front-to-back) directions. Moreover, the pair of feet 440, 442 located at the front end of drinking vessel 400 contact the upper side 342 of seat 340 when vessel 400 is mounted, adding stability and inhibiting any rocking movement of vessel 400. In sum, drinking assembly 200 incorporates various features that function as multiple points of attachment and contact between drinking vessel 400 and housing unit 300, which are designed to create a releasable connection between vessel 400 and housing 300. The user can remove vessel 400 from its seated mounting relationship to housing unit 300 by using, as lift-up leverage points, the handle-type indentation 430 formed at the front end of vessel 400 and the extending projection lip 458 formed at the back end of vessel 400 (but after first disengaging the sealing connection at grommet 394). Additionally, a measure of positional stability is created and maintained by the features designed to guide and locate the drinking vessel 400 within housing unit 300, namely, the mating engagement between the concave relief features 420, 422 formed at the underside of drinking vessel 400 and the complementary convex relief features 370, 372 formed at the top side of seat 340.

Figure 13:
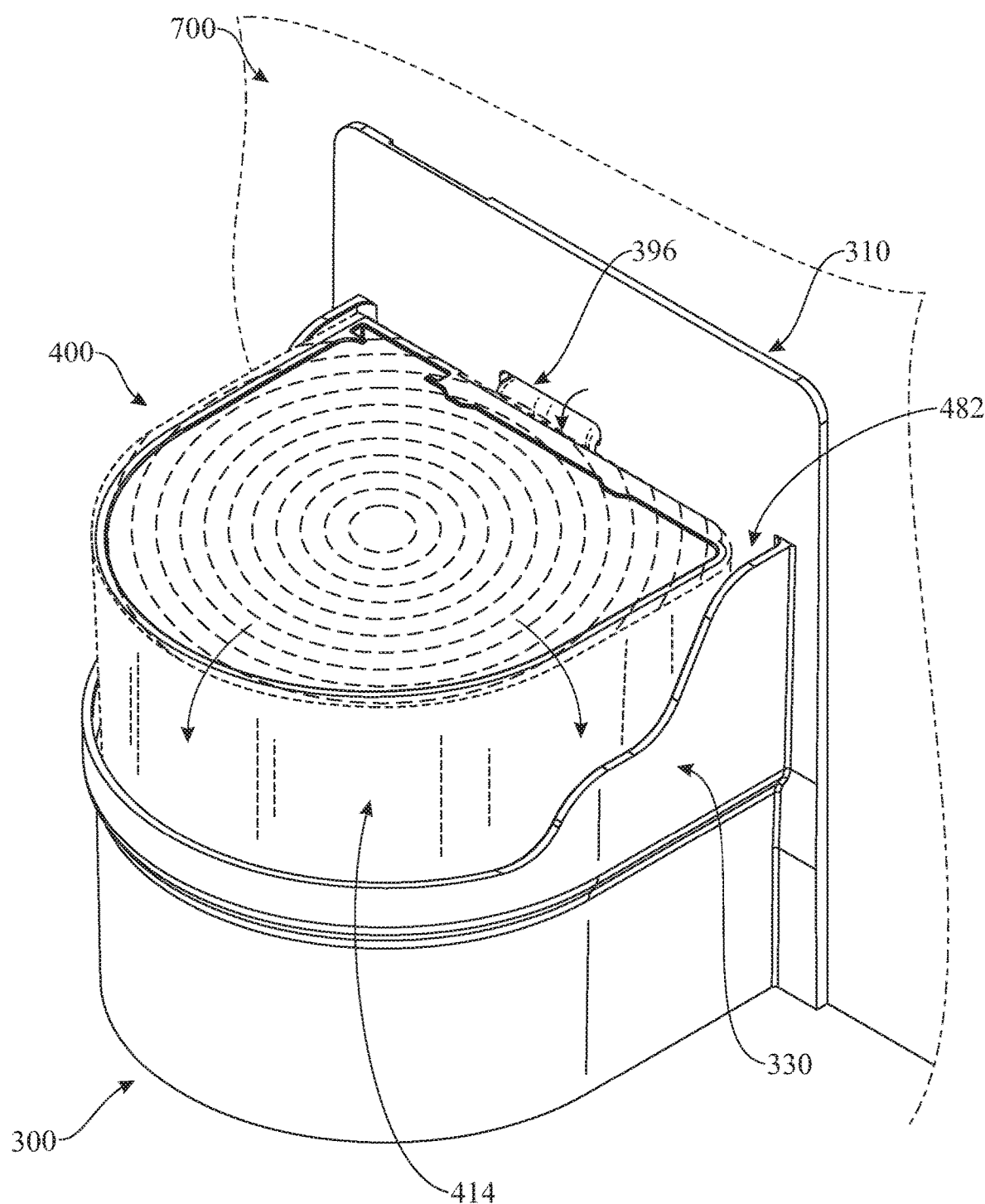
FIG. 13 is a perspective view of the drinking assembly of FIG. 9, and further depicted in FIG. 12, which shows an exemplary rendering of overflow conditions from both the drinking vessel and the supply reservoir (hidden from view behind the mounting wall), to highlight various plumbing features designed as protective measures to handle the overflow.
Figure 15:
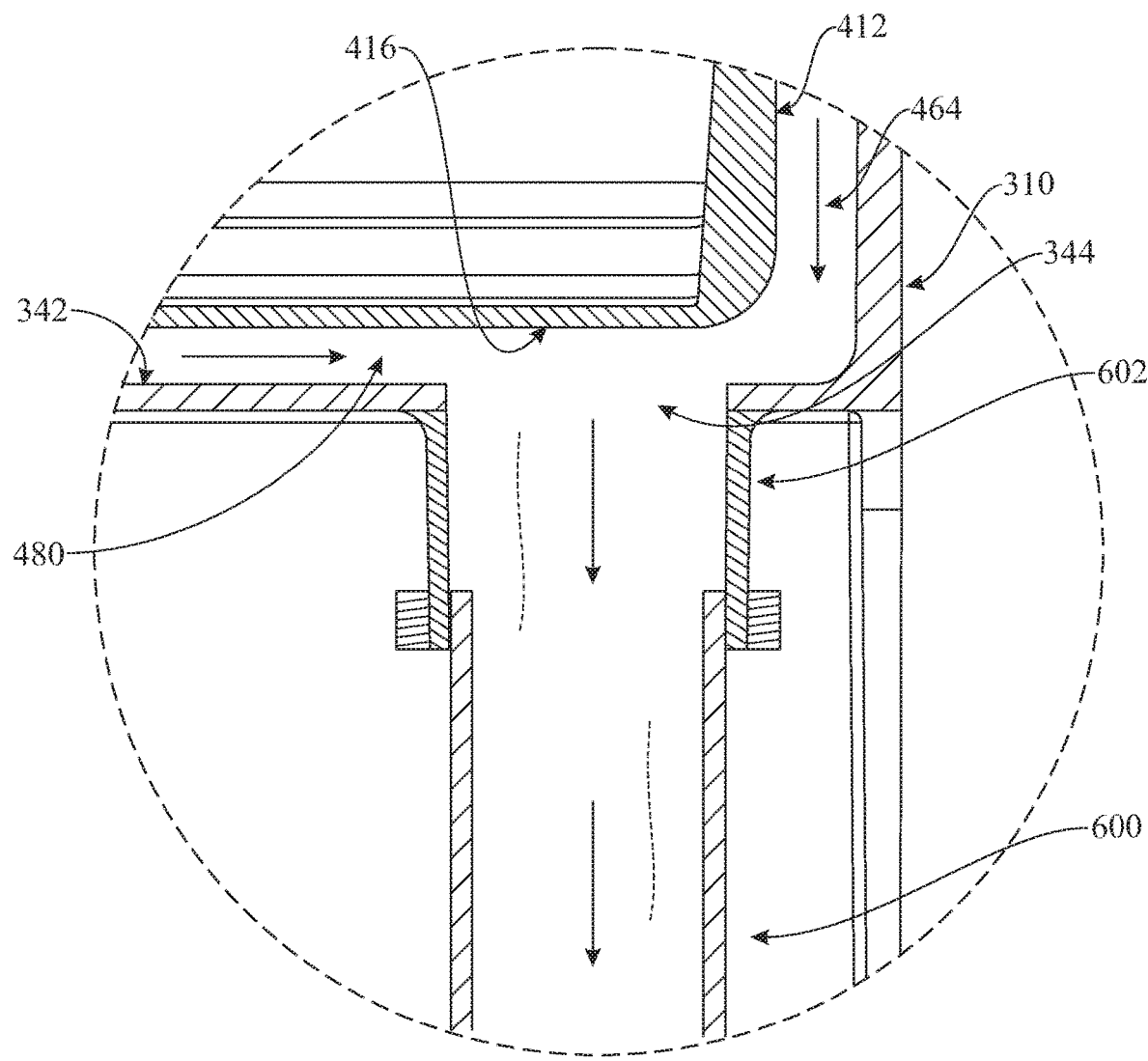
FIG. 15 is a cross-sectional right side elevation view, shown in a partial enlarged section view and taken along the cross-sectional plane 15-15 depicted in FIG. 10, illustrating the migration paths of overflow water originating as surplus from the drinking vessel (horizontal migration) and as excess from the supply reservoir (vertical migration), and further illustrating the drainage of the composite overflow from the underside of the housing unit.

With particular reference to FIGS. 9, 13, 14 and 15, the construction of drinking assembly 200, and particularly the configuration of housing unit 300 and drinking vessel 400, is designed to create a variety of water-communicating clearance gaps in the assembled combination, which serve a variety of purposes (i.e., gaps 358, 464, 480, and 482). In order to accomplish the desired spacing among the various components, the components of drinking assembly 200 are configured with the appropriate dimensions and geometry in a coordinated manner, using design techniques and processes well known to those skilled in the art. In one such clearance feature of the invention, the offset of upper portion 352 from lower portion 350 of curving sidewall 330 of housing unit 300 (as implemented by transition portion 354) creates a narrow peripheral shelf 356 that adjoins and circumscribes the outer boundary of upper side 342 of seat 340 (FIG. 14). This peripheral shelf 356 establishes a continuous clearance gap 358 around the entire perimeter of seat 340 in housing unit 300. Additionally, according to another feature of the invention, the curving sidewall 330 (at upper portion 352) of housing unit 300 and the curving sidewall 414 of drinking vessel 400 are continuously separated by a clearance gap 482 (FIGS. 9 and 13). These two clearance gaps 358 and 482 cooperate to allow water overflowing from drinking vessel 400 (at sidewall 414) to reach the floor of housing unit 300 (i.e., upper side 342 of seat 340) and eventually migrate to drainage hole 344 (FIGS. 13 and 15). According to still another feature of the invention, a clearance gap 480 is formed between the bottom 416 of drinking vessel 400 and the upper side 342 of seat 340 of housing unit 300 (FIG. 14). This gap 480 permits any fluid collected or flowing in clearance gaps 358 and 482 to have a pathway to reach drainage hole 344 (FIG. 15). Finally, according to yet another feature of the invention, a clearance gap 464 exists between the back wall 412 (at main wall section 45) of drinking vessel 400 and vertical headwall 310 (at front surface 311) of housing unit 300 (FIG. 14). This gap 464 permits overflow water exiting supply container 500 at slot 396 (formed in headwall 310) to migrate down headwall 310 and eventually be routed to drainage hole 344 (FIGS. 13 and 15). Overall, the collection of clearance gaps 358, 464, 480, and 482 act cooperatively and interactively to furnish drinking assembly 200 with features designed for overflow protection.

Figure 12:
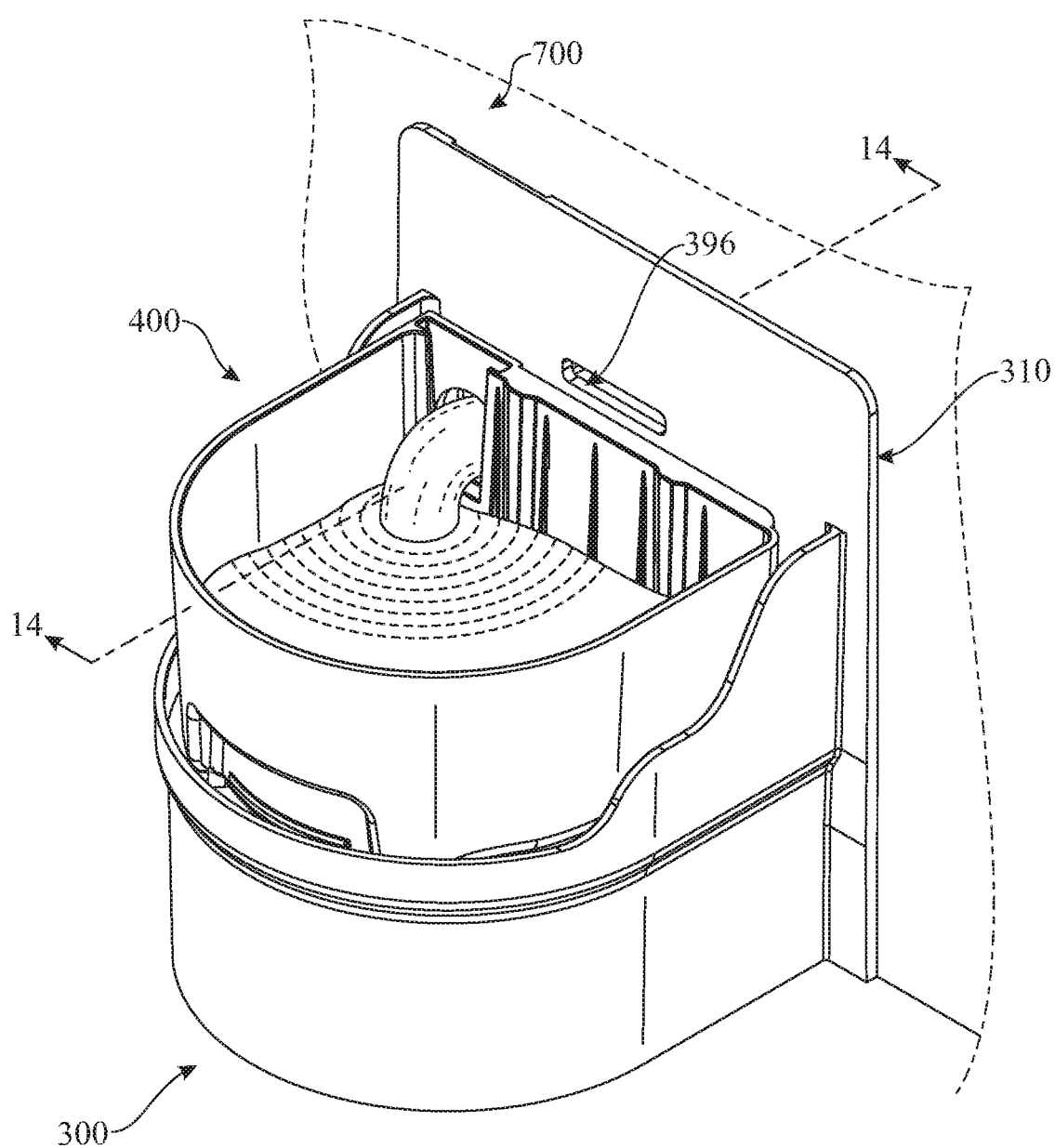
FIG. 12 is a perspective view of the drinking assembly of FIG. 9, illustrating an exemplary installation of the drinking assembly and depicting its operation with a water flow entering and filling the drinking vessel.

Turning now to FIGS. 9, 12 and 14, during operation, after drinking assembly 200 has been assembled (FIG. 9), water contents from supply container 500 are conveyed into drinking vessel 400 through fluid channel 470, which connects the fluid opening 392 formed in headwall 310 of housing unit 300 to fluid opening 462 formed in back wall 412 of drinking vessel 400. Under normal operation, a float valve assembly 510 (FIG. 14) installed in supply container 500 will regulate the flow of water supplied to container 500 and maintain it at a safe level within non-overflow margins (FIG. 12). Once the shut-off point is reached in float valve assembly 510 commensurate with a predetermined water level, the inlet valve is closed and the admittance of water into container 500 is ceased. As water is removed from drinking vessel 400, such as by evaporation or animal consumption, the water level in container 500 experiences a corresponding decrease. At a certain reduced point of the water level, the inlet valve of float valve assembly 510 re-opens, and water is once again admitted into container 500, replenishing and refilling drinking vessel 400. This cycle of water usage, refilling and replenishment occurs automatically and perpetually, since water pressure is constantly present at the inlet valve of supply container 500 (much like water faucets) and float valve assembly 510 operates automatically to adjust water intake based on the water level.

Referring now to FIGS. 13-15, under some circumstances, however, overflow conditions occur, such as when the float valve assembly 510 fails or works abnormally. In the event of such conditions, the overflow features of drinking assembly 200 can address the problem. Referring in particular to FIG. 13, excess water in supply container 500 can flow through overflow slot 396 formed in headwall 310. The slot 396 is suitably located generally at the level of the upper edge of drinking vessel 400, so that water exiting from slot 396 does not pour into vessel 400. After exiting slot 396, the overflow water originating from container 500 enters the clearance gap 464 formed between drinking vessel 400 (at main wall section 450 of back wall 412) and headwall 310 (at front surface 311), this is best shown in FIG. 14. This overflow water travels or migrates down and through clearance gap 464 until it reaches the bottom (i.e., upper side 342 of seat 340 of housing unit 300) and flows into drainage hole 344 (FIG. 15). As illustrated in FIG. 13, at the drinking side of housing unit 300, surplus water exceeding the capacity of drinking vessel 400 pours over the upper edge of curved sidewall 414 and enters the clearance gap 482 formed between the inner-nested curved sidewall 414 (of drinking vessel 400) and the outer-nested curved sidewall 330 (of housing unit 300); this gap 482 extends completely around their periphery. This overflow water travels or migrates down and through clearance gap 464 until it reaches the bottom at seat 340, where it is immediately captured in clearance gap 358 formed by the transition shoulder or shelf 356 that is defined by the offset between upper sidewall portion 352 and lower sidewall portion 350 of housing unit 300, which is best illustrated in FIG. 14. Due to the elevation or vertical spacing of drinking vessel 400 relative to seat 340, which is defined by clearance gap 480, overflow water that reaches the upper side 342 of seat 340 has a pathway to migrate to drainage hole 344. Seat 340, at upper side 342, functions as a collection point for overflow water, especially excess water spilling from drinking vessel 400.

Referring now to FIGS. 10, 14 and 15, drinking assembly 200 incorporates various features to facilitate its mounting installation, particularly at the rear side 304 of housing unit 300, according to aspects of the present invention. First, regarding the drainage features of drinking assembly 200, the housing unit 300 is equipped with a suitable adapter or coupling 602 that serves as a drain extension from drainage hole 344 formed in seat 340. The drain extension 602 makes it easier to connect drainage hole 344 to plumbing lines 600, such as PVC tubing, that is connected to the existing plumbing system in the dwelling where drinking assembly 200 is located. The plumbing lines 600 would be attached following mounted installation of drinking assembly 200. In order to facilitate access to the underside of housing unit 300, and particularly to permit a drain hook-up of plumbing line 600 to drain extension 602, an opening circumscribed by edge profile 532 and generally illustrated at 530 is formed at the bottom of headwall 310. This access way is important, since the hook-up will occur inside a wall cavity or cabinet, both tight spaces. In order to equip supply container 500 for installation and operation, an inlet port (not shown) is formed in one of the sides of container 500 and a suitable adapter or coupling (not shown) is attached to it to permit hook-up to a pressurized water line. The manner of configuring supply container 500 with such a hook-up adopts conventional methods well known to those skilled in the art. At the interior of supply container 500, the inlet port is connected in a conventional manner to a water-regulating mechanism such as a float valve assembly generally illustrated at 510 (FIG. 14), which is housed in a conventional manner inside supply container 500.

With reference to FIGS. 10 and 12, and regarding installation, the drinking assembly 200 employs vertical headwall 310 of housing unit 300 as the mounting platform for attachment to a fixture such as a dwelling or cabinet wall generally illustrated at 700 (FIG. 12). In this configuration, a suitable cut-out is made in wall 700 to fit the rear-side supply container 500, which is located within a cavity behind wall 700 and so not visible from the drinking side of assembly 200. Preferably, the headwall 310 is mounted flush against wall 700. Any suitable attachment feature can be integrated into housing unit 300 to facilitate the support and mounting of drinking assembly 200 to wall 700. For example, a set of keyhole slots 524 can be formed in headwall 310, which fit over suitable hooks or other hanging elements provided in wall 700 (FIG. 10). Moreover, a set of vertically-oriented, L-shaped mounting rails or tracks 520, 522 can be provided at the rear surface 313 of headwall 310, which function as flanges or brackets that can support attachment to a wall feature in 700, such as a wall guard. A notch (not shown) can be formed in rear surface 313 of headwall 310, for example, to provide a locking connection to wall 700, such as near the upper edge 312 of headwall 310. The supply container 500 exhibits various favorable dimensional properties. For example, the depth of container 500, corresponding to the amount that container 500 extends away from headwall 310, is appropriately selected to conform to certain fitness criteria, such as the ability to situate container 500 within a standard 2×4 wall stud pocket. Additionally, the elevation or height placement of container 500 on headwall 310 takes into account the possibility that the drainage features in assembly 200 could be plumbed to the left or right in the wall stud pocket, providing the installer with flexibility in locating and plumbing assembly 200. Locating container 500 at an adequate height provides sufficient space to accommodate a range of plumbing options and routing directions.

In summary the water fountain can accommodate a variety of animals that could include dogs, cats, rabbits and any other animal species that could approach the water fountain seeking to drink water. The water fountain has a constant supply of water and does not require any activity by the animal to operate the water fountain. The water fountain is also capable of controlling the draining overflow water to prevent flooding and damaging of property surrounding the water fountain. The self-filling, self-draining water fountain can operate without assistance or supervision and alleviates the nuisance of constantly filling the pet's water bowl and keeping up with the pet's demand for water consumption. The water fountain requires no power to operate, and is easy to set up and maintain. The water fountain is fluidly connected to a pressurized water supply (such as a domestic water system), and is configured to re-fill a drinking receptacle upon the drinking receptacle being depleted. The fountain includes a float valve that is fluidly connected to a first reservoir that opens in response to a level of the drinking receptacle decreasing past a threshold level, and closes once the drinking receptacle has been re-filled. The system includes a drain configured to avoid overflowing, thus preventing the risk of flood or damage to property or residence. The invention provides a watering system that is fully automatic from the introduction of water to the water fountain to the solving of the potential hazard of a faulty valve ruining property. Owners' concern for their pets as well as their concern for their property are addressed and solved by the present invention.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:
1. A drinking assembly, comprising:
  a first subassembly comprising:
    a partition having a front side and a rear side,
    a fluid supply container extending outwardly from the rear side of the partition,
    a supply aperture formed in the partition and opening into the supply container,
    a seat extending from the partition at the front side thereof at a location below the supply aperture, and
    a sidewall extending from the partition at the front side thereof and contiguously spanning a periphery of the seat; and
  a second subassembly comprising:
    a drinking reservoir removably mountable to the seat of the first subassembly,
    the drinking reservoir including a bottom, a rear wall, and a sidewall extending from the rear wall and contiguously spanning a periphery of the bottom, and
    an inlet aperture formed in the rear wall and alignable with the supply aperture formed in the partition.

2. The drinking assembly of claim 1, wherein:
the first subassembly further comprises:
- a drain hole formed in the seat,
- at least one convex feature formed at an upper side of the seat,
- an overflow slot formed in the partition and opening into the supply container,
- wherein the sidewall includes an upper sidewall portion, a lower sidewall portion, and a shoulder-forming transition portion joining the upper sidewall portion and the lower sidewall portion and defining an offset of the upper sidewall portion relative to the lower sidewall portion, and wherein the seat is generally coplanar with the transition portion,
- a first coupling feature formed at a generally front location of the seat and having a female portion; and the second subassembly further comprises:
- at least one concave feature formed at a lower side of the bottom of the drinking reservoir and mateably complementary to the at least one convex feature of the first subassembly,
- wherein the rear wall of the drinking reservoir includes a main wall section and an offset wall section adjoining the main wall section, wherein the inlet aperture is formed in the offset wall section, and
- a second coupling feature formed at an outer, generally front surface of the sidewall of the drinking reservoir and having a male portion mateably complementary to the female portion of the first coupling feature.

3. The drinking assembly of claim 2, wherein:
the first coupling feature of the first subassembly further includes a generally curved, raised body having a top side, a front side, a rear side, and a generally laterally extending groove formed in the rear side and defining the female portion; and
the second coupling feature of the second subassembly further includes a generally laterally extending projection defining the male portion and formed at a recessed section of the sidewall of the drinking reservoir.

4. The drinking assembly of claim 3, wherein a coverage footprint of the sidewall of the drinking reservoir of the second subassembly is smaller than a coverage footprint of the upper sidewall portion of the sidewall of the first subassembly to define a clearance gap therebetween.

5. The drinking assembly of claim 2, further comprises:
an assembled configuration adoptable by the drinking assembly featuring the drinking reservoir of the second subassembly removably housed in the first subassembly at the seat thereof,
wherein the adoptable configuration further includes:
a first clearance gap defined between the partition of the first subassembly at the front side thereof and the rear wall of the drinking reservoir of the second subassembly at the main wall section thereof,
a second clearance gap defined between the sidewall of the drinking reservoir of the second subassembly and the upper sidewall portion of the sidewall of the first subassembly,
a third clearance gap defined between the bottom of the drinking reservoir of the second subassembly and an upper side of the seat of the first subassembly, and
a fourth clearance gap defined by the offset of the upper sidewall portion relative to the lower sidewall portion of the sidewall of the first subassembly.

6. The drinking assembly of claim 2, further includes:
a grommet disposed in the supply aperture, wherein during assembly the inlet aperture of the drinking reservoir receives the grommet;
a pair of front feet disposed at the lower side of the bottom of the drinking reservoir;
at least one attachment feature disposed at the rear side of the partition and configured to facilitate mounting of the drinking assembly;
a handle-forming indentation formed at an outer front end of the sidewall of the drinking reservoir to define a recessed surface, and a generally laterally extending rib projection formed at the recessed surface and defining the male portion of the second coupling feature of the second subassembly; and
a raised retaining structure extending from the seat and defining the first coupling feature of the first subassembly, the retaining structure having a top side, a front side, a rear side, and a generally laterally extending groove formed in the rear side and defining the female portion of the first coupling feature;
wherein the upper sidewall portion of the sidewall of the first subassembly includes a first variable-height section and a second variable-height section each disposed at a respective end of the sidewall adjacent the partition.

7. The drinking assembly of claim 6, further includes:
a pair of spaced-apart track guides disposed opposite the offset wall section of the rear wall of the drinking reservoir to define a generally vertically-oriented filter-receiving slot therebetween;
wherein the offset wall section has a sufficient thickness such that during reception of the grommet into the inlet aperture during assembly, a filter-occupying space of the filter-receiving slot is free of intrusion from the grommet.

8. The drinking assembly of claim 7, further includes:
an opening formed at a lower edge of the partition to facilitate rear side access to the drain hole formed in the seat.

9. A drinking assembly, comprising:
a housing unit including:
- a wall partition having a front side and a rear side,
- a fluid supply container extending outwardly from the rear side of the partition,
- a fluid supply aperture formed in the partition and opening into the supply container,
- an overflow slot formed in the partition and opening into the supply container,
- a generally horizontal seat extending from the partition at the front side thereof at a location below the supply aperture,
- a drain hole formed in the seat,
- a generally curved sidewall extending from the partition at the front side thereof and circumscribing the seat,
- a raised retaining structure formed at a front area of the seat and having a top side,
- a front side, a rear side, and a generally laterally extending groove formed in the rear side and defining a female portion, and
- at least one protuberance extending upward from the seat;

an open drinking reservoir removably mountable to the housing seat, the drinking reservoir including:

a body having a bottom side, a rear side, and a generally curved sidewall extending from the rear side and circumscribing the bottom side,
an inlet aperture formed in the rear side and alignable during assembly with the supply aperture formed in the partition,
an indentation formed at an outer front end of the sidewall of the drinking reservoir to define a recessed surface,
a generally laterally extending rib projection formed at the recessed surface and defining a male portion mateably complementary to the female portion of the retaining structure of the housing unit, and
at least one depression formed at a lower outer surface of the bottom side and configured to be mateably complementary to the at least one protuberance at the seat of the housing unit.

10. The drinking assembly of claim 9, wherein:
the at least one protuberance extending from the seat of the housing unit includes at least one convex feature disposed generally longitudinally; and
the at least one depression formed in the bottom side of the drinking reservoir includes at least one concave feature disposed generally longitudinally.

11. The drinking assembly of claim 9, wherein:
the curved sidewall of the housing unit includes:
an upper sidewall portion, a lower sidewall portion, and a shoulder-forming transition portion joining the upper sidewall portion and the lower sidewall portion and defining an offset of the upper sidewall portion relative to the lower sidewall portion, and
wherein the seat of the housing unit is generally coplanar with the transition portion.

12. The drinking assembly of claim 11, further includes:
an assembled configuration adoptable by the drinking assembly featuring the drinking reservoir removably disposed in the housing unit at the seat thereof,
wherein the adoptable assembled configuration further includes:
a first clearance gap defined between the partition of the housing unit at the front side thereof and the rear side of the drinking reservoir,
a second clearance gap defined between the sidewall of the drinking reservoir and the upper sidewall portion of the sidewall of the housing unit,
a third clearance gap defined between the bottom side of the drinking reservoir and an upper side of the seat of the housing unit, and
a fourth clearance gap defined by the offset of the upper sidewall portion relative to the lower sidewall portion of the sidewall of the housing unit.

13. The drinking assembly of claim 12, wherein the adoptable assembled configuration further includes:
at a front end of the seat-disposed drinking reservoir, a mating interfit engagement between the rib projection of the drinking reservoir and the groove of the retaining structure of the housing unit;
at a rear end of the seat-disposed drinking reservoir, a fluid communication pathway between the inlet aperture of the drinking reservoir and the supply aperture formed in the partition of the housing unit; and
at an underside of the drinking reservoir, a corresponding mating engagement between the at least one protuberance of the housing unit and the at least one depression of the drinking reservoir to define an interface therebetween suitable to locate the drinking reservoir in the housing unit at the seat thereof.

14. The drinking assembly of claim 13, further includes:
a grommet disposed in the supply aperture;
wherein the adoptable assembled configuration further includes reception of the grommet by the inlet aperture of the drinking reservoir.

15. The drinking assembly of claim 9, further includes:
an assembled configuration adoptable by the drinking assembly featuring the drinking reservoir removably mounted to the housing unit at the seat thereof,
wherein the adoptable assembled configuration further includes:
at a front end of the seat-mounted drinking reservoir, a mating interfit engagement between the rib projection of the drinking reservoir and the groove of the retaining structure of the housing unit;
at a rear end of the seat-mounted drinking reservoir, a fluid communication pathway between the inlet aperture of the drinking reservoir and the supply aperture formed in the partition of the housing unit; and
at an underside of the drinking reservoir, a corresponding mating engagement between the at least one protuberance of the housing unit and the at least one depression of the drinking reservoir to define an interface therebetween suitable to locate the drinking reservoir in the housing unit at the seat thereof.

16. A drinking combination, comprising:
a housing unit including:
a partition having a front side and a rear side,
a fluid supply container extending outwardly from the rear side of the partition,
a fluid supply aperture formed in the partition and opening into the supply container,
an overflow slot formed in the partition and opening into the supply container,
a seat extending from the partition at the front side thereof at a location below the supply aperture,
a drain hole formed in the seat,
a sidewall extending from the partition at the front side thereof and peripherally surrounding the seat,
a raised retaining structure formed at a front area of the seat and having a top side,
a front side, a rear side, and a generally laterally extending groove formed in the rear side, and
at least one protuberance feature extending from the seat;
an open drinking reservoir removably supportable in the housing unit at the seat thereof, the drinking reservoir including:
a body having a bottom side, a rear side, and a sidewall extending from the rear side and surrounding the bottom side,
an inlet aperture formed in the rear side,
an indentation formed at an outer front end of the sidewall of the drinking reservoir to define a recessed surface,
a generally laterally extending ridge projection formed at the recessed surface of the indentation and mateably complementary to the groove formed in the retaining structure of the housing unit, and
at least one depression feature formed at a lower outer surface of the bottom side of the drinking reservoir body and configured to be mateably complementary to the at least one protuberance feature at the seat of the housing unit; and an assembled configuration adoptable by the drinking combination featuring the drinking reservoir removably mounted to the housing unit at the seat thereof,
wherein the adoptable assembled configuration further includes:
  at a front end of the seat-mounted drinking reservoir, a mating interfit engagement between the ridge projection of the drinking reservoir and the groove of the retaining structure of the housing unit,
  at a rear end of the seat-mounted drinking reservoir, a fluid communication pathway between the inlet aperture of the drinking reservoir and the supply aperture formed in the partition of the housing unit, and
  at an underside of the drinking reservoir, a corresponding mating engagement between the at least one protuberance feature of the housing unit and the at least one depression feature of the drinking reservoir to define an interface therebetween suitable to locate the drinking reservoir in the housing unit at the seat thereof.

17. The drinking combination of claim 16, wherein the adoptable assembled configuration further includes:
  a first clearance gap defined between the partition of the housing unit at the front side thereof and the rear side of the drinking reservoir;
  a second clearance gap defined between the sidewall of the drinking reservoir and a portion of the sidewall of the housing unit facing the sidewall of the drinking reservoir; and
  a third clearance gap defined between the bottom side of the drinking reservoir and an upper side of the seat of the housing unit.

18. The drinking combination of claim 17, wherein:
the sidewall of the housing unit further includes:
  an upper sidewall portion, a lower sidewall portion, and a shoulder-forming transition portion joining the upper sidewall portion and the lower sidewall portion and defining an offset of the upper sidewall portion relative to the lower sidewall portion,
  wherein the seat of the housing unit is generally coplanar with the transition portion; and
the adoptable assembled configuration further includes:
  a fourth clearance gap defined by the offset of the upper sidewall portion relative to the lower sidewall portion of the sidewall of the housing unit.

19. The drinking combination of claim 18, wherein:
the rear side of the drinking reservoir body includes a main wall section and an offset wall section adjoining the main wall section, wherein the inlet aperture is formed in the offset wall section; and
the first clearance gap is defined between the partition of the housing unit at the front side thereof and the rear side of the drinking reservoir at the main wall section thereof.

20. The drinking combination of claim 18, further includes:
  a pair of front feet disposed underneath the drinking reservoir body;
  at least one attachment feature disposed at the rear side of the partition and configured to facilitate mounting of the housing unit; and
  wherein the upper sidewall portion of the sidewall of the housing unit includes a first variable-height section and a second variable-height section each disposed at a respective end of the sidewall adjacent the partition and configured to ascend towards the partition.

* * * * *